United States Patent
Nikko

(10) Patent No.: US 11,579,853 B2
(45) Date of Patent: Feb. 14, 2023

(54) INFORMATION PROCESSING APPARATUS, COMPUTER-READABLE RECORDING MEDIUM STORING COMPILING PROGRAM, AND COMPILING METHOD

(71) Applicant: FUJITSU LIMITED, Kawasaki (JP)

(72) Inventor: Tomoko Nikko, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/529,329

(22) Filed: Nov. 18, 2021

(65) Prior Publication Data

US 2022/0291908 A1    Sep. 15, 2022

(30) Foreign Application Priority Data

Mar. 15, 2021 (JP) .............................. JP2021-041104

(51) Int. Cl.
G06F 9/44 (2018.01)
G06F 8/41 (2018.01)

(52) U.S. Cl.
CPC .......... G06F 8/4441 (2013.01); G06F 8/4434 (2013.01)

(58) Field of Classification Search
None
See application file for complete search history.

(56) References Cited

U.S. PATENT DOCUMENTS

| | | | | |
|---|---|---|---|---|
| 11,068,247 B2 * | 7/2021 | Sabne | ...................... | G06F 8/443 |
| 11,256,488 B1 * | 2/2022 | Elango | .................. | G06F 8/4434 |
| 11,334,331 B2 * | 5/2022 | Craik | ..................... | G06F 9/3851 |
| 2011/0047534 A1 * | 2/2011 | Ye | .............................. | G06F 8/45 717/160 |
| 2014/0331210 A1 * | 11/2014 | Bowler | ................... | G06F 8/443 717/129 |
| 2014/0344795 A1 | 11/2014 | Nikko et al. | | |
| 2015/0135171 A1 * | 5/2015 | Ishii | ........................ | G06F 8/452 717/150 |
| 2020/0264855 A1 * | 8/2020 | Miyamoto | .............. | G06F 8/447 |

FOREIGN PATENT DOCUMENTS

| | | |
|---|---|---|
| JP | H07-121381 A | 5/1995 |
| JP | H08-101776 A | 4/1996 |
| JP | 2014-228891 A | 12/2014 |

* cited by examiner

*Primary Examiner* — Qamrun Nahar
(74) *Attorney, Agent, or Firm* — Fujitsu Patent Center

(57) ABSTRACT

An information processing apparatus includes a processor configured to: for each of a plurality of loops, acquire loop information including a number of variables, a number of registers, a number of memory commands for inputting and outputting a value of the variable between the register and a main storage device, and a number of arithmetic commands for the value of the variable stored in the register, which are used in the loop; calculate the number of variables, the number of registers, the number of memory commands, and the number of arithmetic commands, which correspond to a combination of the loops that are candidates for loop fusion, for each of the combinations of the loops;

determine a combination to which the loop fusion is to be applied among the combinations which are calculated for each of the combinations; and execute the loop fusion on the determined combination.

8 Claims, 30 Drawing Sheets

FIG. 7A

LOOP FUSION AVAILABLE

```
do i = 1,10        ! LOOP 1a
  do j = 1,10
    a = a + 1.0
  enddo
enddo
do i = 1,10        ! LOOP 2a
  do j = 1,10
    B(j,i) = b+1.0
  enddo
enddo
```
⌐71

FIG. 7B

LOOP FUSION UNAVAILABLE

```
do i = 1,10        ! LOOP 1b
  do j = 1,10
    a = a + 1.0
  enddo
enddo
do i = 1,10        ! LOOP 2b
  do j = 1,10
    B(j,i) = a +1.0
  enddo
enddo
```
⌐72

FIG. 8A

LOOP FUSION AVAILABLE

─ 73

```
do i = 1,10        ! LOOP 1c
  do j = 1,10
    A(j,i) = A(j,i) + 1.0
  enddo
enddo
do i = 1,10        ! LOOP 2c
  do j = 1,10
    B(j,i) = B(j,i)+1.0
  enddo
enddo
```

FIG. 8B

LOOP FUSION UNAVAILABLE

─ 74

```
do i = 1,10        ! LOOP 1d
  c=d*i
  do j = 1,10
    A(j,i) = A(j,i) + 1.0
  enddo
enddo
do i = 1,10        ! LOOP 2d
  do j = 1,10
    B(j,i) = B(j,i)+1.0
  enddo
enddo
```

FIG. 10A

LOOP FUSION AVAILABLE

```
do i = 1,10          ! LOOP 1f
  do j = 1,10
    A(j,i) = A(j,i) + 1.0
  enddo
enddo
do i = 1,10          ! LOOP 2f
  do j = 1,10
    B(j,i) = A(j+1,i)+1.0
  enddo
enddo
```
— 81

FIG. 10B

LOOP FUSION UNAVAILABLE

```
do i = 1,10          ! LOOP 1g
  do j = 1,10
    A(j+1,i) = A(j+1,i) + 1.0
  enddo
enddo
do i = 1,10          ! LOOP 2g
  do j = 1,10
    B(j,i) = A(j,i)+1.0
  enddo
enddo
```
— 82

FIG. 11A

LOOP FUSION AVAILABLE

```
do i = 1,10        ! LOOP 1h
  do j = 1,10
    A(j,i) = A(j,i) + 1.0
  enddo
enddo
do i = 2,10        ! LOOP 2h
  do j = 2,10
    B(j,i) = B(j,i+1)+1.0
  enddo
enddo
do i = 1,10        ! LOOP 3h
  do j = 1,10
    B(j,i) = A(j+1,i)+1.0
  enddo
enddo
```
— 83

FIG. 11B

LOOP FUSION UNAVAILABLE

```
do i = 1,10        ! LOOP 1i
  do j = 1,10
    C(j,i) = C(j,i)+1.0
  enddo
enddo
do i = 1,10        ! LOOP 2i
  do j = 1,10
    A(j+1,i) = A(j+1,i) + 1.0
  enddo
enddo
do i = 1,10        ! LOOP 3i
  do j = 1,10
    B(j,i) = A(j,i)+1.0
  enddo
enddo
```
— 84

FIG. 14

CONTROL INFORMATION STORAGE UNIT 132

LOOP INFORMATION

LOOP 1

| VARIABLE INFORMATION | VARIABLE NAME | EXISTING LOOP | |
|---|---|---|---|
| | a | LOOP 3 | |
| | USE VARIABLE NAME | CONTROL VARIABLE | |
| | a | No | |
| | i | Yes | |
| | j | Yes | |
| NUMBER OF REGISTERS | INTEGER REGISTER | FLOATING-POINT REGISTER | |
| | 2 | 1 | |
| LOOP SHAPE | INITIAL VALUE | END VALUE | INCREMENT VALUE |
| | 1 | 10 | 1 |
| COMMAND INFORMATION | NUMBER OF MEMORY COMMANDS | FOUR FUNDAMENTAL OPERATION COMMANDS | |
| | — | 1 | |

LOOP 2

| VARIABLE INFORMATION | VARIABLE NAME | EXISTING LOOP | |
|---|---|---|---|
| | B | LOOP 3 | |
| | USE VARIABLE NAME | CONTROL VARIABLE | |
| | B | No | |
| | i | Yes | |
| | j | Yes | |
| NUMBER OF REGISTERS | INTEGER REGISTER | FLOATING-POINT REGISTER | |
| | 2 | 1 | |
| LOOP SHAPE | INITIAL VALUE | END VALUE | INCREMENT VALUE |
| | 2 | 10 | 1 |
| COMMAND INFORMATION | NUMBER OF MEMORY COMMANDS | FOUR FUNDAMENTAL OPERATION COMMANDS | |
| | 2 | 1 | |

FIG. 15

| LOOP INFORMATION | | | | 132 |
|---|---|---|---|---|
| LOOP 3 | | | | |
| VARIABLE INFORMATION | VARIABLE NAME | | EXISTING LOOP | |
| | C | | LOOP 4 | |
| | a | | LOOP 3 | |
| | USE VARIABLE NAME | | CONTROL VARIABLE | |
| | C | | No | |
| | a | | No | |
| | i | | Yes | |
| | j | | Yes | |
| NUMBER OF REGISTERS | INTEGER REGISTER | | FLOATING-POINT REGISTER | |
| | 2 | | 1 | |
| LOOP SHAPE | INITIAL VALUE | END VALUE | INCREMENT VALUE | |
| | 1 | 10 | 1 | |
| COMMAND INFORMATION | NUMBER OF MEMORY COMMANDS | | FOUR FUNDAMENTAL OPERATION COMMANDS | |
| | 1 | | 1 | |
| LOOP 4 | | | | |
| VARIABLE INFORMATION | VARIABLE NAME | | EXISTING LOOP | |
| | C | | LOOP 4 | |
| | D | | LOOP 4 | |
| | USE VARIABLE NAME | | CONTROL VARIABLE | |
| | C | | No | |
| | D | | No | |
| | i | | Yes | |
| | j | | Yes | |
| NUMBER OF REGISTERS | INTEGER REGISTER | | FLOATING-POINT REGISTER | |
| | 2 | | 2 | |
| LOOP SHAPE | INITIAL VALUE | END VALUE | INCREMENT VALUE | |
| | 1 | 10 | 1 | |
| COMMAND INFORMATION | NUMBER OF MEMORY COMMANDS | | FOUR FUNDAMENTAL OPERATION COMMANDS | |
| | 2 | | 1 | |

FIG. 16

LOOP INFORMATION — 132

| LOOP 5 | | |
|---|---|---|
| VARIABLE INFORMATION | VARIABLE NAME | EXISTING LOOP |
| | E | LOOP 5 |
| | USE VARIABLE NAME | CONTROL VARIABLE |
| | E | No |
| | i | Yes |
| | j | Yes |
| NUMBER OF REGISTERS | INTEGER REGISTER | FLOATING-POINT REGISTER |
| | 2 | 1 |
| LOOP SHAPE | INITIAL VALUE / END VALUE / INCREMENT VALUE | |
| | 2 / 10 / 1 | |
| COMMAND INFORMATION | NUMBER OF MEMORY COMMANDS | FOUR FUNDAMENTAL OPERATION COMMANDS |
| | 2 | 1 |

FIG. 17

CONTROL INFORMATION STORAGE UNIT — 130

LOOP FUSION CANDIDATE INFORMATION — 133

| TRIGGER | | | | 1 | | | |
|---|---|---|---|---|---|---|---|
| ITEM | LOOP | MASK | NUMBER OF VARIABLES | NUMBER OF REGISTERS | DEPENDENCE | NUMBER OF MEMORY COMMANDS | NUMBER OF ARITHMETIC COMMANDS |
| FUSION CANDIDATE | 1,2 | true | 2 | 4,2 | false | 2 | 2 |
| | 1,4 | false | 3 | 4,4 | false | 2 | 2 |
| | 1,5 | true | 2 | 4,2 | false | 2 | 2 |
| | 1,2,4 | true | 4 | 6,4 | false | 4 | 3 |
| | 1,2,5 | true | 4 | 6,3 | false | 4 | 3 |
| | 1,4,5 | true | 4 | 6,4 | false | 4 | 3 |
| | 1,2,4,5 | true | 5 | 8,5 | false | 6 | 4 |

| TRIGGER | | | | 2 | | | |
|---|---|---|---|---|---|---|---|
| ITEM | LOOP | MASK | NUMBER OF VARIABLES | NUMBER OF REGISTERS | DEPENDENCE | NUMBER OF MEMORY COMMANDS | NUMBER OF ARITHMETIC COMMANDS |
| FUSION CANDIDATE | 2,3 | true | 3 | 4,2 | false | 3 | 2 |
| | 2,4 | true | 3 | 5,3 | false | 4 | 2 |
| | 2,5 | false | 2 | 4,2 | false | 4 | 2 |
| | 2,3,5 | true | 4 | 6,3 | false | 5 | 3 |
| | 2,4,5 | true | 4 | 6,4 | false | 6 | 3 |

FIG. 18

CONTROL INFORMATION STORAGE UNIT — 130

LOOP FUSION CANDIDATE INFORMATION — 133

| TRIGGER | 3 | | | | | |
|---|---|---|---|---|---|---|
| ITEM | LOOP | MASK | NUMBER OF VARIABLES | NUMBER OF REGISTERS | DEPENDENCE | NUMBER OF MEMORY COMMANDS | NUMBER OF ARITHMETIC COMMANDS |
| FUSION CANDIDATE | 3,5 | false | 3 | 4,3 | false | 4 | 2 |

| TRIGGER | 4 | | | | | |
|---|---|---|---|---|---|---|
| ITEM | LOOP | MASK | NUMBER OF VARIABLES | NUMBER OF REGISTERS | DEPENDENCE | NUMBER OF MEMORY COMMANDS | NUMBER OF ARITHMETIC COMMANDS |
| FUSION CANDIDATE | 4,5 | true | 3 | 4,3 | false | 4 | 2 |

FIG. 25

LOOP FUSION CANDIDATE INFORMATION / 133

| TRIGGER | | | | | | | |
|---|---|---|---|---|---|---|---|
| ITEM | LOOP | MASK | NUMBER OF VARIABLES | NUMBER OF REGISTERS | DEPENDENCE | NUMBER OF MEMORY COMMANDS | NUMBER OF ARITHMETIC COMMANDS |
| | 1,2 | true | 2 | 4,2 | false | 2 | 2 |
| | 1,4 | false | 3 | 4,4 | false | 2 | 2 |
| | 1,5 | true | 2 | 4,2 | false | 2 | 2 |
| FUSION CANDIDATE | 1,2,4 | true | 4 | 6,4 | false | 4 | 3 |
| | 1,2,5 | true | 4 | 6,3 | false | 4 | 3 |
| | 1,4,5 | true | 4 | 6,4 | false | 4 | 3 |
| | 1,2,4,5 | true | 5 | 8,5 | false | 6 | 4 |
| ... | | | | | | | |

FIG. 26

```
do j = 1, NY
  do i = 1,NX
    do k = 1, NZ
      A1(k,i,j) = (V(k,i,j)-V(k-1,i,j)) -&
                  (V(k+1,i,j)-V(k-2,i,j))
      B1(k,i,j) = (A1(k,i,j)-A1(k-1,i,j)) - &
                  (A1(k+1,i,j)-A1(k,i-2,j))
    enddo
  enddo
enddo                                           } LOOP 1j do j = 1, NY
  do i = 1,NX
    do k = 1, NZ
      C1(k,i,j) = (B1(k,i,j)-B1(k-1,i,j)) -&
                  (B1(k+1,i,j)-B1(k-2,i,j))
    enddo
  enddo
enddo                                           } LOOP 2j do j = 2, MY,3
  do i = 2,  MX
    do k = 2, MZ
      D1(k,i,j) = (D2(k,i,j)-D2(k-1,i,j)) -&
                  (D2(k+1,i,j)-D2(k-2,i,j))
    enddo
  enddo
enddo                                           } LOOP 3j
```

```
                                                                111c
fix_Y = max(NY, MY) ⎫
fix_X = max(NX, MX) ⎬ END VALUE OBTAINMENT
fix_Z = max(NZ, MZ) ⎭
loop_1_musk_instruction(fix_Y, fix_X, fix_Z) ! 0 INITIALIZATION  ⎫
loop_3_musk_instruction(fix_Y, fix_x, fix_Z) ! 0 INITIALIZATION  ⎪
do j = 1, NX                                                    ⎪
  do i = 1, NX                                                  ⎪
    do k = 1, NZ                                                ⎪
      loop1_musk_instruction(k,i,j) = 1                         ⎪
    enddo                                                       ⎪
  enddo                                                         ⎬ MASK
enddo                                                           ⎪ GENERATION
do j = 2, MY,3                                                  ⎪
  do i = 2, MX                                                  ⎪
    do k = 2, MZ                                                ⎪
      loop2_musk_instruction(k,i,j) = 1                         ⎪
    enddo                                                       ⎪
  enddo                                                         ⎪
enddo                                                           ⎭
do j = 1, fix_Y
  do i = 1,fix_X
    do k = 1, fix_Z
      ! LOAD V, A1, AND D1 BY USING LOAD COMMAND WITH MASK, AND
      ! STORE IN A1, B1, AND D1 BY USING STORE COMMAND WITH MASK
      A1(k,i,j) = (V(k,i,j)-V(k-1,i,j)) -(V(k+1,i,j)-V(k-2,i,j))
      B1(k,i,j) = (A1(k,i,j)-A1(k-1,i,j))-(A1(k+1,i,j)-A1(k,i-2,j))
      D1(k,i,j) = (D2(k,i,j)-D2(k-1,i,j)) - (D2(k+1,i,j)-D2(k-2,i,j))
    enddo
  enddo
enddo
do j = 1, NY
  do i = 1,NX
    do k = 1, NZ
      C1(k,i,j) = (B1(k,i,j)-B1(k-1,i,j)) - (B1(k+1,i,j)-B1(k-2,i,j))
    enddo
  enddo
enddo
```

FIG. 28

```
do j = 1, fix_Y
  do i = 1,fix_X
    do k = 1, fix_Z
      ! LOAD V, A1, AND D1 BY USING LOAD COMMAND WITH MASK, AND
      ! STORE IN A1, B1, AND D1 BY USING STORE COMMAND WITH MASK
      A1(k,i,j) = (V(k,i,j)-V(k-1,i,j)) -(V(k+1,i,j)-V(k-2,i,j))
      B1(k,i,j) = (A1(k,i,j)-A1(k-1,i,j))-(A1(k+1,i,j)-A1(k,i-2,j))
      D1(k,i,j) = (D2(k,i,j)-D2(k-1,i,j)) - (D2(k+1,i,j)-D2(k-2,i,j))
    enddo
  enddo
enddo
```

| NUMBER OF CYCLES | ARITHMETIC ELEMENT | | | |
|---|---|---|---|---|
| 1 | (1) | (2) | | |
| 2 | (4) | (5) | | |
| 3 | (17) | (18) | | |
| 4 | (20) | (21) | | |
| 5 | | | | |
| 6 | | | | |
| 7 | | | | |
| 8 | | | | |
| 9 | | | (3) | |
| 10 | | | (6) | (19) |
| 11 | | | | (22) |
| 12 | | | | |
| 13 | | | | |
| 14 | | | (7) | |
| 15 | | | | (23) |
| 16 | | | | |
| 17 | (8) | | | |
| 18 | (9) | | | (24) |

FIG. 29

```
do j = 1, NY
  do i = 1,NX
    do k = 1, NZ
      A1(k,i,j) = (V(k,i,j)-V(k-1,i,j)) -(V(k+1,i,j)-V(k-2,i,j))
      B1(k,i,j) = (A1(k,i,j)-A1(k-1,i,j)) -(A1(k+1,i,j)-A1(k,i-2,j))
      C1(k,i,j) = (B1(k,i,j)-B1(k-1,i,j)) -(B1(k+1,i,j)-B1(k-2,i,j))
    enddo
  enddo
enddo
```

| NUMBER OF CYCLES | ARITHMETIC ELEMENT | | | |
|---|---|---|---|---|
| 1 | (1) | (2) | | |
| 2 | (4) | (5) | | |
| 3 | | | | |
| 4 | | | | |
| 5 | | | | |
| 6 | | | | |
| 7 | | | | |
| 8 | | | | |
| 9 | | | (3) | |
| 10 | | | (6) | |
| 11 | | | | |
| 12 | | | | |
| 13 | | | | |
| 14 | | | (7) | |
| 15 | | | | |
| 16 | | | | |
| 17 | (8) | | | |
| 18 | (9) | | | |
| ... | ... | ... | ... | ... |

FIG. 30

| NUMBER OF CYCLES | ARITHMETIC ELEMENT | | | |
|---|---|---|---|---|
| ... | ... | ... | ... | ... |
| 36 | (17) | (18) | | |
| 37 | (20) | (21) | | |
| 38 | | | | |
| 39 | | | | |
| 40 | | | | |
| 41 | | | | |
| 42 | | | | |
| 43 | | | | |
| 44 | | | (19) | |
| 45 | | | (22) | |
| 46 | | | | |
| 47 | | | | |
| 48 | | | | |
| 49 | | | (23) | |
| 50 | | | | |
| 51 | | | | |
| 52 | (24) | | | |

202

INFORMATION PROCESSING APPARATUS, COMPUTER-READABLE RECORDING MEDIUM STORING COMPILING PROGRAM, AND COMPILING METHOD

CROSS-REFERENCE TO RELATED APPLICATION

This application is based upon and claims the benefit of priority of the prior Japanese Patent Application No. 2021-41104, filed on Mar. 15, 2021, the entire contents of which are incorporated herein by reference.

FIELD

The embodiments discussed herein are related to an information processing apparatus, a non-transitory computer-readable recording medium storing a compiling program, and a compiling method.

BACKGROUND

In software development, a compiler that converts source codes described in a high-level language into object codes described in a low-level language such as a machine language is often used. In a process of converting the source code into the object code, a compiler may perform various optimizations to improve execution efficiency of the object code. In the optimization, loop optimization such as loop fusion, loop expansion, and loop division may be performed. For example, in the loop fusion, the execution efficiency may be improved by analyzing structures of loops existing in the code and fusing a plurality of loops to reduce locality of data and the number of loop determinations.

Japanese Laid-open Patent Publication No. 7-121381, Japanese Laid-open Patent Publication No. 8-101776, and Japanese Laid-open Patent Publication No. 2014-228891 are disclosed as related art.

SUMMARY

According to an aspect of the embodiments, an information processing apparatus includes: a memory configured to store a code to be processed; and a processor configured to: for each of a plurality of loops included in the code, acquire loop information including a number of variables, a number of registers, a number of memory commands for inputting and outputting a value of the variable between the register and a main storage device, and a number of arithmetic commands for the value of the variable stored in the register, which are used in the loop; based on the acquired loop information, calculate the number of variables, the number of registers, the number of memory commands, and the number of arithmetic commands, which correspond to a combination of the loops that are candidates for loop fusion, for each of a plurality of the combinations of the loops; determine a combination to which the loop fusion is to be applied among the plurality of combinations, based on the number of variables, the number of registers, and a comparison of the number of memory commands and the number of arithmetic commands, which are calculated for each of the plurality of combinations; and execute the loop fusion on the determined combination.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A and 7B are diagrams illustrating an example of a loop fusion determination from a viewpoint of a reduction loop;

FIGS. 8A and 8B are diagrams illustrating an example of a loop fusion determination from a viewpoint of a tight loop;

FIGS. 10A and 10B are diagrams illustrating an example of a loop fusion determination from a viewpoint of data dependence;

FIGS. 11A and 11B are diagrams illustrating another example of the loop fusion determination from the viewpoint of data dependence;

FIG. 14 is a diagram illustrating an example of loop information;

FIG. 15 is a diagram illustrating the example of the loop information (following FIG. 14);

FIG. 16 is a diagram illustrating the example of the loop information (following FIG. 15);

FIG. 17 is a diagram illustrating an example of loop fusion candidate information;

FIG. 18 is a diagram illustrating the example of the loop fusion candidate information (following FIG. 17);

FIG. 25 is a diagram illustrating an example of a determination result of a loop fusion target;

FIG. 26 is a diagram illustrating another example of the code as the determination target of loop fusion;

FIG. 27 is a diagram illustrating an example of the code after loop fusion;

FIG. 28 is a diagram illustrating an example of command scheduling;

FIG. 29 is a diagram illustrating a comparative example of the command scheduling; and FIG. 30 is a diagram illustrating the comparative example (following FIG. 29) of the command scheduling.

DESCRIPTION OF EMBODIMENTS

For example, there is proposed a loop optimization method in which a compiler estimates the number of registers to be used from a command set constituting a loop to limit the number of expanded loops to a range that does not cause register spilling.

There is also a proposal for a compiler apparatus that does not individually execute a plurality of loop optimizations but analyzes characteristics of a program and hardware according to an optimization level and performs loop optimizations in combination according to the analysis.

There is also a proposal for a compiling program that calculates a ratio between the number of arithmetic operations executed and the number of data transfers in each loop process, and determines whether or not loop fusion is possible depending on whether or not the ratio satisfies a reference value specified by a system performance condition.

When a combination of loops to be fused is inappropriate, the execution efficiency of the object code may not be sufficiently improved. For example, in a process of the loop after fusion, there may be a case where processing performance at a time of executing the object code is degraded due to insufficient registers for storing values of variables or insufficient use of arithmetic elements due to inefficient allocation of a plurality of arithmetic elements to a plurality of commands.

In one aspect, an object of the present disclosure is to provide an information processing apparatus, a non-transitory computer-readable recording medium storing a compiling program, and a compiling method that improve processing performance.

Hereinafter, the present embodiments will be described with reference to drawings.

First Embodiment

A first embodiment will be described.

Figure 1:
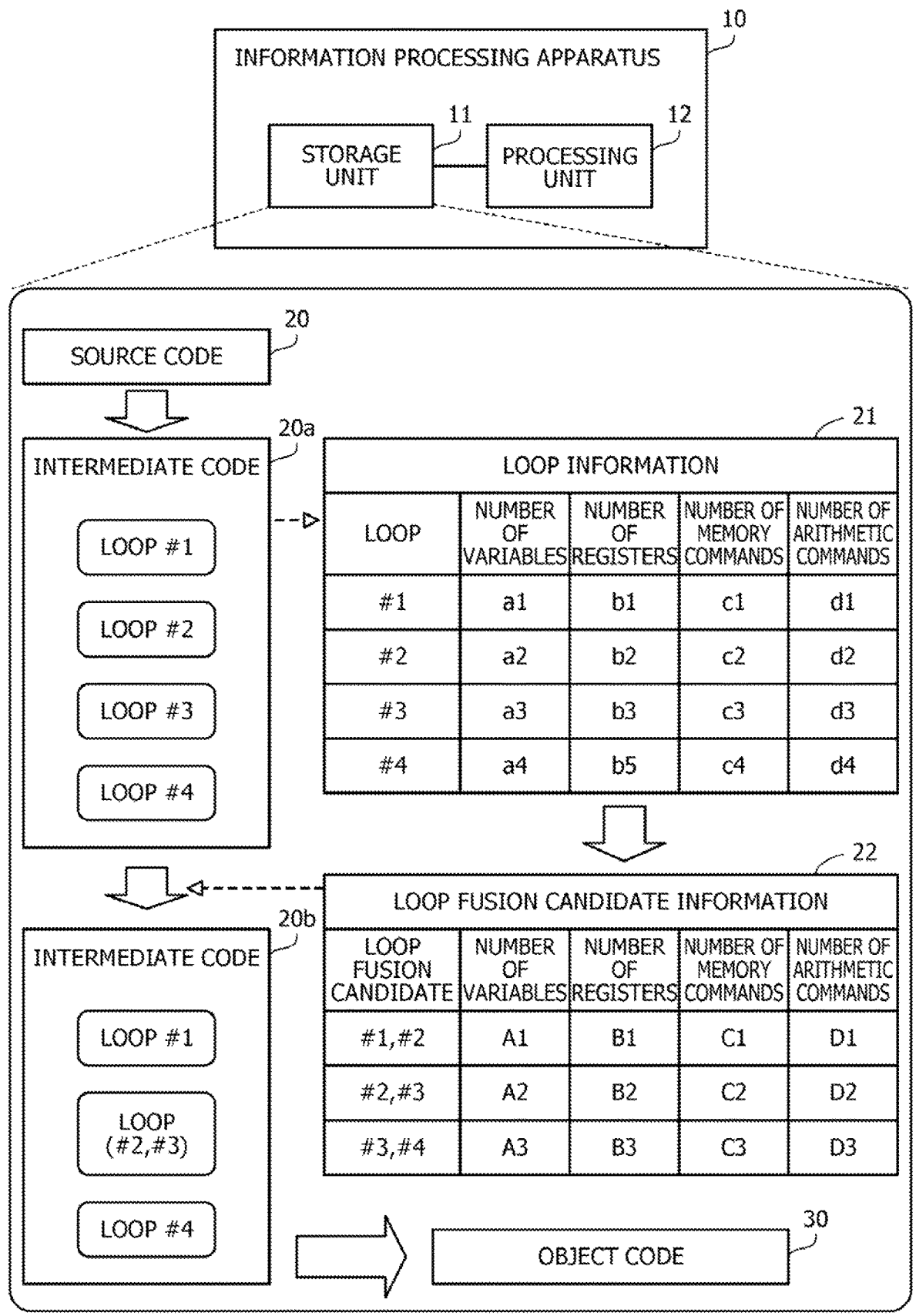
FIG. 1 is a diagram illustrating an information processing apparatus according to a first embodiment.

FIG. 1 is a diagram illustrating an information processing apparatus according to the first embodiment.

An information processing apparatus 10 has a function of a compiler that converts a source code 20 into an object code 30. The information processing apparatus 10 includes a storage unit 11 and a processing unit 12.

The storage unit 11 may be a volatile storage device such as a random-access memory (RAM), and may be a non-volatile storage device such as a hard disk drive (HDD) or a flash memory. The processing unit 12 may include a central processing unit (CPU), a digital signal processor (DSP), an application-specific integrated circuit (ASIC), a field-programmable gate array (FPGA), or the like. The processing unit 12 may be a processor that executes a program. The "processor" may also include a set of a plurality of processors (multiprocessor).

The storage unit 11 stores information used for a compiling process by the processing unit 12. For example, the storage unit 11 stores the source code 20 to be compiled. For example, the source code 20 includes descriptions of processes of loops #1, #2, #3, and #4.

Based on the source code 20, the processing unit 12 generates an intermediate code 20a, which is a code described in an intermediate language, and stores the intermediate code 20a in the storage unit 11. The intermediate code is a code used in the compiler. The intermediate code 20a includes descriptions corresponding to the loops #1 to #4.

The processing unit 12 acquires, for each loop based on the intermediate code 20a, loop information 21 including the number of variables, the number of registers, the number of memory commands, and the number of arithmetic commands used in the loop. The loop information 21 is stored in the storage unit 11.

The memory command is described in the intermediate code 20a and is a command for inputting and outputting a value of a variable between a register and a main storage device. The memory command includes a LOAD command for storing a value of a variable from a main storage device to the register or a STORE command for storing a value of a variable from the register to the main storage device. The arithmetic command is described in the intermediate code 20a and is a command to perform four fundamental operations for a value of a variable stored in the register. The arithmetic command includes an ADD command, a SUB command, a MULT command, and a DIV command.

For example, the number of variables may be the number of variables other than a control variable of the loop. The number of registers may be acquired for each type of register such as an integer register and a floating-point register. For example, the number of variables, the number of registers, the number of memory commands, and the number of arithmetic commands acquired for each of the loops #1 to #4 are registered in the loop information 21.

Based on the loop information 21, the processing unit 12 calculates, for each of a plurality of combinations of loops, the number of variables, the number of registers, the number of memory commands, and the number of arithmetic commands, which correspond to the combination of loops that are candidates for loop fusion. The processing unit 12 records the calculation result in loop fusion candidate information 22. In the loop fusion candidate information 22, the number of variables, the number of registers, the number of memory commands, and the number of arithmetic commands, which are calculated for each combination of loops that are candidates for loop fusion, are recorded. The loop fusion candidate information 22 is stored in the storage unit 11.

The processing unit 12 extracts a combination of loops that are candidates for loop fusion, based on a structure of each loop, such as reduction or a tight loop, or a dependence relationship between variables included in the loop. The combinations of loops that are candidates for loop fusion may include not only combinations of loops having the same acquirable value of the control variable of the loop but also combinations of loops having different acquirable values of the control variable of the loop.

For example, for the loops #1 to #4, it is assumed that combinations of candidates for loop fusion are 3 of a combination of (#1, #2), a combination of (#2, #3), and a combination of (#3, #4). Based on the loop information 21, the processing unit 12 obtains a sum of each of the number of variables, the number of registers, the number of memory commands, and the number of arithmetic commands of the loop belonging to the corresponding combination to obtain the number of variables, the number of registers, the number of memory commands, and the number of arithmetic commands, which correspond to the corresponding combination.

For example, according to the loop information 21, the number of variables of the loop #1 is a1, and the number of variables of the loop #2 is a2. Therefore, the number of variables A1 for a combination of the loops #1 and #2 is A1=a1+a2. For example, according to the loop information 21, the number of memory commands in the loop #1 is c1, and the number of memory commands in the loop #2 is c2. Therefore, the number of memory commands C1 for a combination of the loops #1 and #2 is C1=c1+c2.

Based on the number of variables, the number of registers, and a comparison of the number of memory commands and the number of arithmetic commands, which are calculated for each of the plurality of combinations of loops, the processing unit 12 determines a combination to which loop fusion is to be applied, among the plurality of combinations.

For example, the processing unit 12 gives priority to a combination having a large number of variables, among the respective combinations of the loops as fusion candidates. Among the respective combinations of the loops as the fusion candidates, the processing unit 12 sets, as a combination to which the loop fusion is to be applied, a combination in which the number of registers corresponding to the combination is equal to or smaller than the number of registers included in an information processing apparatus that is scheduled to execute the object code 30. The information processing apparatus that is scheduled to execute the object code 30 may be the information processing apparatus 10.

The processing unit 12 sets a combination in which the number of arithmetic commands is smaller than the number of memory commands as a combination to which loop fusion is to be applied. For example, the processing unit 12 sets a combination in which a value obtained by subtracting a predetermined value from the number of memory commands is equal to or larger than the number of arithmetic commands, as a combination to which loop fusion is to be applied. The predetermined value may be determined in accordance with the number of memory commands included in the information processing apparatus that is scheduled to execute the object code 30 and that are simultaneously executable by a plurality of arithmetic elements that execute arithmetic commands.

The processing unit 12 executes loop fusion on the determined combination of loops. For example, based on the loop fusion candidate information 22, the processing unit 12 determines that the loop fusion is to be applied to (#2, #3), among the combinations of the loops of the fusion candidates (#1, #2), (#2, #3), and (#3, #4). In this case, the processing unit 12 executes loop fusion on the combination (#2, #3) of the loops as the fusion candidates, and generates an intermediate code 20b after the execution of the loop fusion. The intermediate code 20b is stored in the storage unit 11.

The processing unit 12 generates the object code 30, based on the intermediate code 20b. For example, the processing unit 12 generates an assembly language from the intermediate code 20b, generates the object code 30 from the assembly language, and stores the object code 30 in the storage unit 11.

According to the information processing apparatus 10, for each of a plurality of loops included in a code to be processed, the loop information 21 including the number of variables, the number of registers, the number of memory commands, and the number of arithmetic commands used in the loop is acquired. Based on the loop information 21, the number of variables, the number of registers, the number of memory commands, and the number of arithmetic commands, which correspond to the combination of loops that are candidates for loop fusion are calculated for each of the plurality of combinations of loops. Based on the number of variables, the number of registers, and a comparison of the number of memory commands and the number of arithmetic commands, which are calculated for each of the plurality of combinations, a combination to which loop fusion is to be applied is determined, among the plurality of combinations. The loop fusion is executed on the determined combination.

Thus, processing performance may be improved.

In optimization by loop fusion at a time of compiling, when the combination of loops to be fused is inappropriate, execution efficiency of the object code may not be sufficiently improved. For example, in a process of the loop after fusion, there may be a case where processing performance at a time of executing the object code is degraded due to insufficient registers for storing values of variables or insufficient use of arithmetic elements due to inefficient allocation of a plurality of arithmetic elements to a plurality of commands.

Therefore, in the information processing apparatus 10, by determining a combination of loops to which loop fusion is to be applied by using the number of variables, the number of registers, the number of memory commands, and the number of arithmetic commands for the combinations of loops as the fusion candidates, it is possible to suppress spilling due to register shortage and to efficiently use the arithmetic element. For example, as described above, the information processing apparatus 10 preferentially performs loop fusion on a combination having a large number of variables, among combinations in which the number of registers corresponding to the combination of loops is equal to or smaller than the number of physical registers mounted on the apparatus and the number of arithmetic commands is equal to or smaller than a reference value based on the number of memory commands. Thus, it is possible to select, as a fusion target, a combination of loops with a large number of variables and a high possibility of filling the arithmetic element that is a combination of loops that do not exceed the number of physical registers and include arithmetic commands and memory commands in a well-balanced manner.

As a result, in each cycle of execution of the fused loop in the object code 30, it is possible to efficiently allocate the plurality of commands to the arithmetic elements such that empty areas of the plurality of arithmetic elements are reduced, and to improve the processing performance. For example, a processing speed of the fused loop may be improved. The register may be effectively used.

Hereinafter, a function of the compiler in the information processing apparatus 10 will be described more specifically.

Second Embodiment

Next, a second embodiment will be described.

Figure 2:
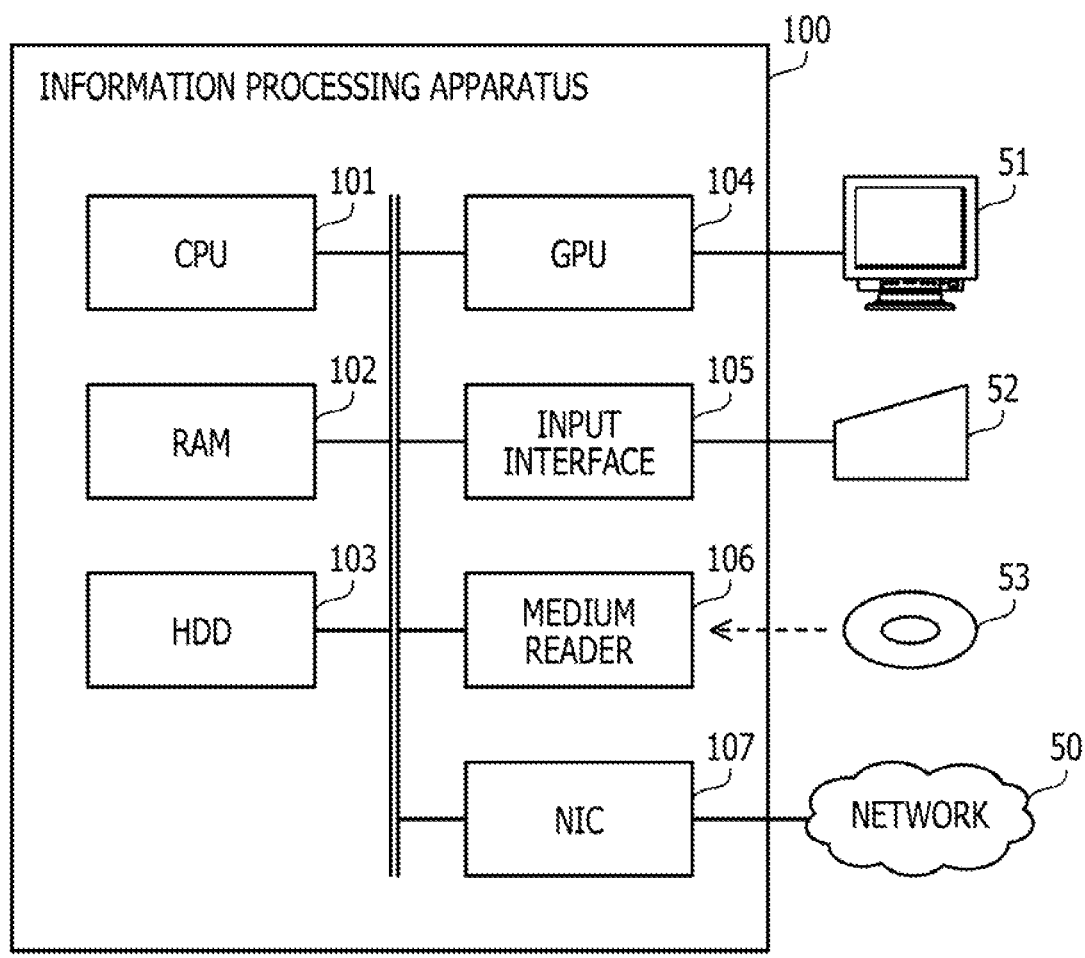
FIG. 2 is a diagram illustrating a hardware example of an information processing apparatus according to a second embodiment.

FIG. 2 is a diagram illustrating a hardware example of an information processing apparatus according to a second embodiment.

An information processing apparatus 100 includes a CPU 101, a RAM 102, an HDD 103, a graphics processing unit (GPU) 104, an input interface 105, a medium reader 106, and a network interface card (NIC) 107. The CPU 101 is an example of the processing unit 12 according to the first embodiment. The RAM 102 or the HDD 103 are examples of the storage unit 11 according to the first embodiment.

The CPU 101 is a processor that executes a command of a program. The CPU 101 loads at least a part of a program or data stored in the HDD 103 into the RAM 102, and executes the program. The CPU 101 may include a plurality of processor cores. The information processing apparatus 100 may have a plurality of processors. Processes described below may be executed in parallel by using a plurality of processors or processor cores. A set of the plurality of processors may be referred to as a "multiprocessor" or simply referred to as a "processor" in some cases.

The RAM 102 is a volatile semiconductor memory that temporarily stores the program executed by the CPU 101 and data used for the operation by the CPU 101. The RAM 102 is used as a main storage device of the information processing apparatus 100. The main storage device may be referred to as a main memory or simply a memory. The information processing apparatus 100 may include memories of types other than the RAM, and may include a plurality of memories.

The HDD 103 is a non-volatile storage device that stores data as well as programs of software such as an operating system (OS), middleware, and application software. The information processing apparatus 100 may include other types of storage devices such as a flash memory and a solid-state drive (SSD), and may include a plurality of non-volatile storage devices.

The GPU 104 outputs an image to a display 51 coupled to the information processing apparatus 100 in accordance with a command from the CPU 101. Any type of display such as a cathode ray tube (CRT) display, a liquid crystal display (LCD), a plasma display, or an organic electro-luminescence (OEL) display may be used as the display 51.

The input interface 105 acquires an input signal from an input device 52 coupled to the information processing apparatus 100, and outputs the input signal to the CPU 101. As the input device 52, a pointing device such as a mouse, a touch panel, a touchpad, or a trackball, a keyboard, a remote controller, a button switch, or the like may be used. A plurality of types of input devices may be coupled to the information processing apparatus 100.

The medium reader 106 is a reading device that reads a program or data recorded in a recording medium 53. For example, a magnetic disk, an optical disc, a magneto-optical (MO) disk, a semiconductor memory, or the like may be used as the recording medium 53. The magnetic disk includes a flexible disk (FD) or an HDD. The optical disc includes a compact disc (CD) or a Digital Versatile Disc (DVD).

For example, the medium reader 106 copies a program or data read from the recording medium 53 into another recording medium such as the RAM 102 or the HDD 103. The read program is executed by, for example, the CPU 101. The recording medium 53 may be a portable recording medium, and may be used to distribute the program and the data. The recording medium 53 and the HDD 103 will be referred to as computer-readable recording medium in some cases.

The NIC 107 is coupled to the network 50 and is an interface that communicates with another computer via the network 50. The NIC 107 is coupled, for example, to a communication device such as a switch or a router via a cable.

Figure 3:
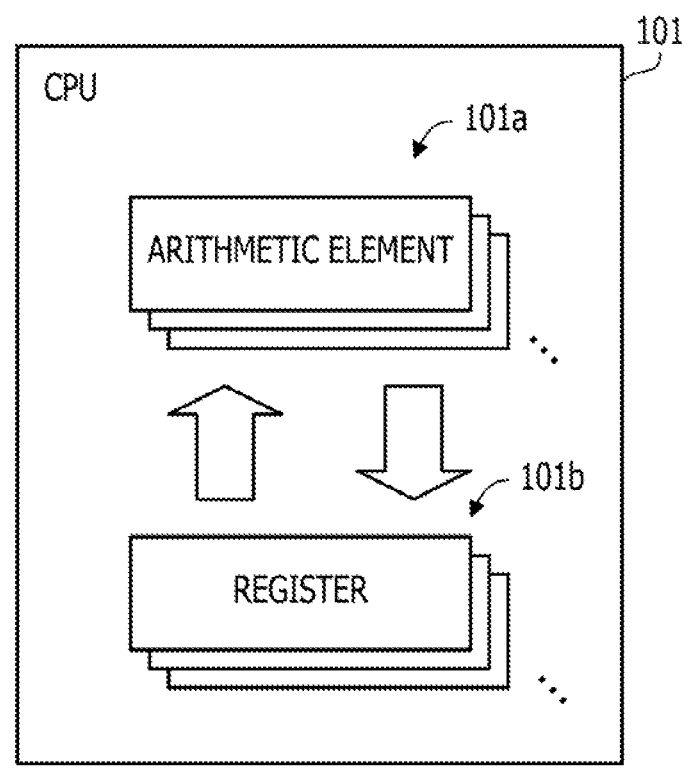
FIG. 3 is a diagram illustrating a hardware example of a central processing unit (CPU)

FIG. 3 is a diagram illustrating a hardware example of a CPU.

The CPU 101 includes an arithmetic element group 101a and a register group 101b. The arithmetic element group 101a is a group of arithmetic elements included in the CPU 101. The register group 101b is a group of general-purpose registers included in the CPU 101. Hereinafter, the general-purpose register is simply referred to as a register. The register includes an integer register for storing an integer value or a floating-point register for storing a floating-point value. The register group 101b includes a plurality of integer registers and a plurality of floating-point registers.

The arithmetic element is an arithmetic execution circuit that executes a numerical operation on a value stored in the register, and is also referred to as an arithmetic and logic unit (ALU). In one example, the CPU 101 includes 4 arithmetic elements. Each arithmetic element performs an operation on data in the register and writes an operation result in the register.

Figure 4:
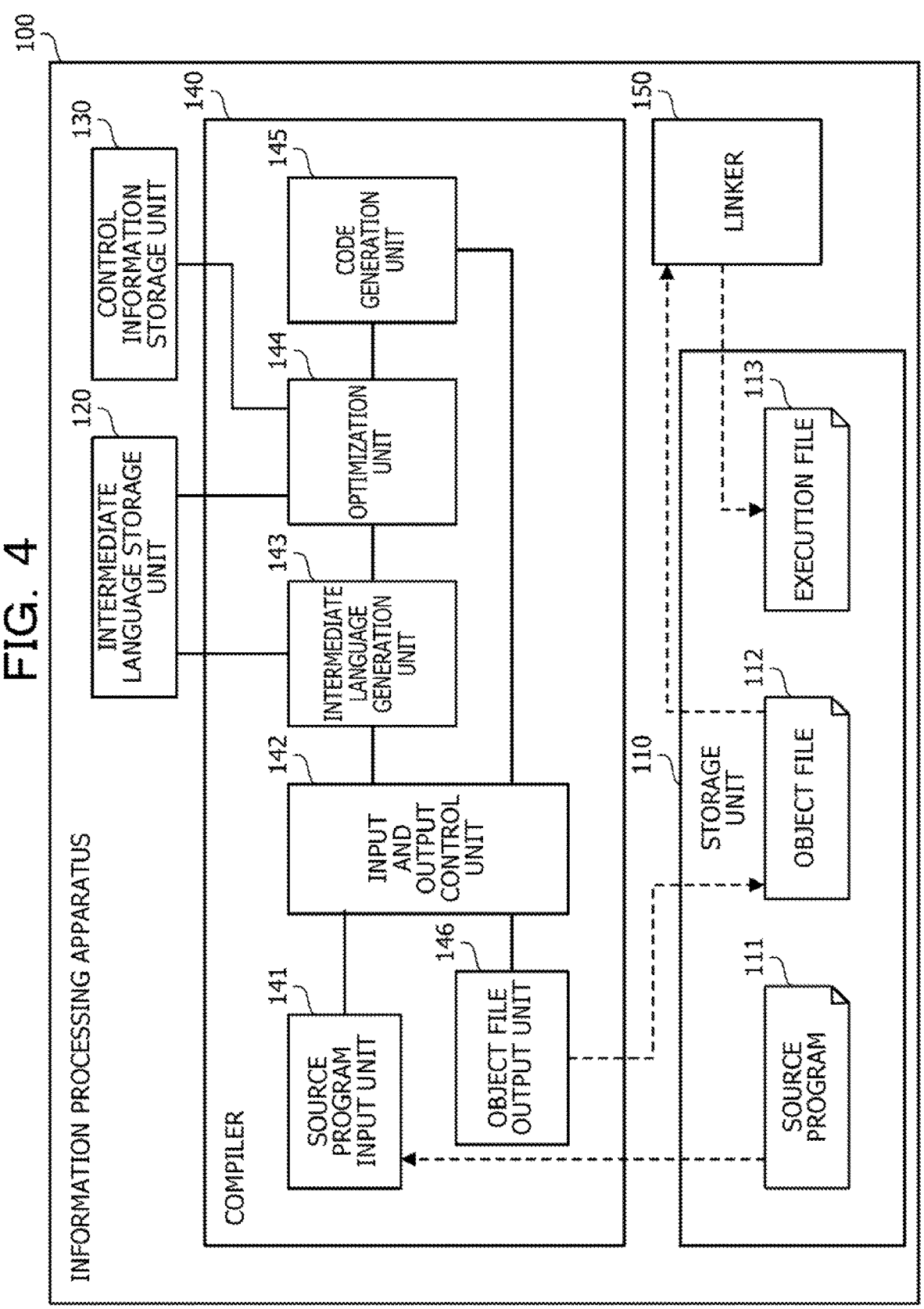
FIG. 4 is a diagram illustrating a function example of the information processing apparatus.

FIG. 4 is a diagram illustrating a function example of the information processing apparatus.

The information processing apparatus 100 includes a storage unit 110, an intermediate language storage unit 120, a control information storage unit 130, a compiler 140, and a linker 150. A storage region of the RAM 102 or the HDD 103 is used for the storage unit 110, the intermediate language storage unit 120, and the control information storage unit 130. The compiler 140 and the linker 150 are implemented by the CPU 101 executing the program stored in the RAM 102.

The storage unit 110 stores information to be used for processes of the compiler 140 and the linker 150. For example, the storage unit 110 stores a source program 111, an object file 112, and an execution file 113.

The source program 111 is a file including source codes described in a high-level language. The object file 112 is a file including object codes generated by compiling the source program 111 by the compiler 140. As described above, the object code is described in a low-level language such as a machine language. The execution file 113 is a file generated by combining the object file 112 and a library file by the linker 150.

The intermediate language storage unit 120 stores an intermediate language generated by the compiler 140.

The control information storage unit 130 stores control information to be used for an optimization process of the compiler 140.

The compiler 140 compiles the source program 111 and outputs the object file 112 as a compiling result. The compiler 140 includes a source program input unit 141, an input and output control unit 142, an intermediate language generation unit 143, an optimization unit 144, a code generation unit 145, and an object file output unit 146.

The source program input unit 141 opens the designated source program 111. For example, when a compiling start is instructed, the source program input unit 141 reads the source program 111 stored in the storage unit 110 and outputs the source program 111 to the input and output control unit 142.

The input and output control unit 142 executes selection of various processes in accordance with a type of option or file. For example, in a case where the source program 111 is input from the source program input unit 141, the input and output control unit 142 outputs the source program 111 to the intermediate language generation unit 143. In a case where an assembly language is input from the code generation unit 145, the input and output control unit 142 outputs the assembly language to the object file output unit 146.

The intermediate language generation unit 143 generates an intermediate language from the source program 111 input from the input and output control unit 142, and stores the intermediate language in the intermediate language storage unit 120. For example, the intermediate language generation unit 143 converts the source program 111 into intermediate codes to be used in the optimization unit 144, for example, codes to be used in the compiler. The intermediate language generation unit 143 stores the converted intermediate language in the intermediate language storage unit 120.

The optimization unit 144 performs optimization including source analysis or loop fusion in order to speed up execution of the object code corresponding to the source program 111.

In the source analysis, the optimization unit 144 analyzes the intermediate language. For example, the optimization unit 144 reads the intermediate language from the intermediate language storage unit 120, and executes line reconstruction, lexical analysis, syntax analysis, semantic analysis, and the like.

From a result of the source analysis, the optimization unit 144 determines a combination of loops as a fusion candidate, based on a loop condition of each of the plurality of loops existing in the source program 111 or the intermediate language generated from the source program 111. For example, the optimization unit 144 determines the combination of loops as the fusion candidate, based on a structure of the loop such as reduction or a tight loop, or data dependence in the loop. The optimization unit 144 may determine the combination of loops as the fusion candidate, regardless of whether or not initial values, end values, and increment values of the loops are the same.

In optimization by loop fusion, for each combination of loops as a fusion candidate, the optimization unit 144 calculates a sum of the number of variables of each loop belonging to the combination, a sum of the number of integer registers, a sum of the number of floating-point registers, a sum of the number of memory commands, and a sum of the number of arithmetic commands. The optimization unit 144 stores a calculation result in the control information storage unit 130. Based on the number of variables, the number of integer registers, the number of floating-point registers, and a comparison of the number of memory commands and the number of arithmetic commands, which are calculated for each of combinations of loops as the fusion candidate, the optimization unit 144 determines a combination to which loop fusion is to be applied, among the combinations of loops as the fusion candidate. The optimization unit 144 executes loop fusion on the determined combination of loops, and outputs an intermediate language after the loop fusion to the code generation unit 145.

The code generation unit 145 generates an assembly language from the intermediate language optimized by the optimization unit 144. The code generation unit 145 outputs the generated assembly language to the input and output control unit 142.

When the assembly language is input from the input and output control unit 142, the object file output unit 146 generates the object file 112 from the assembly language, and stores the object file 112 in the storage unit 110.

The linker 150 reads the object file 112 generated by the object file output unit 146 from the storage unit 110, and combines the object file 112 and the library file to generate the execution file 113. The linker 150 stores the generated execution file 113 in the storage unit 110.

Next, an example of loop fusion by the optimization unit 144 will be described.

Figure 5:
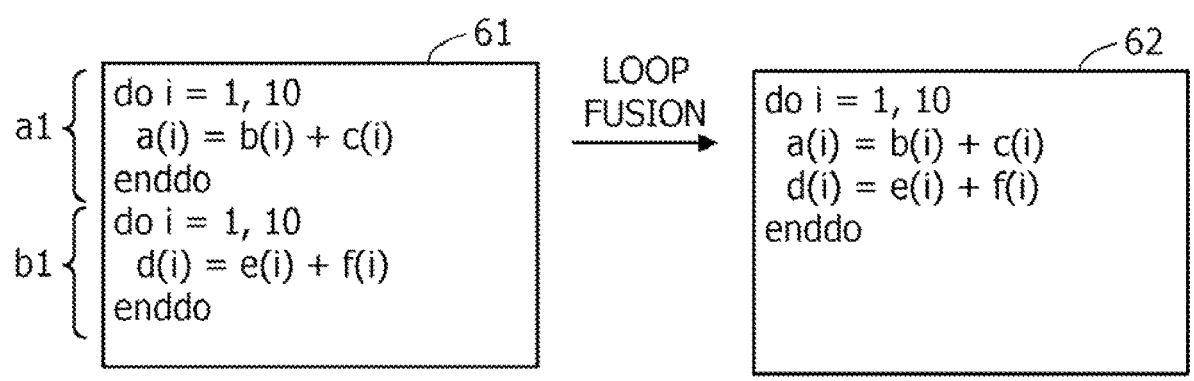
FIG. 5 is a diagram illustrating a first example of loop fusion.

FIG. 5 is a diagram illustrating a first example of loop fusion.

For example, in a case where it is determined that the loop a1 and the loop b1 in a code 61 are available for fusion, the optimization unit 144 inserts an arithmetic equation of the loop b1 next to an arithmetic equation in the loop a1 to convert the code 61 into a code 62, and processes the code as one loop. In this manner, it is possible to reduce a cost for the repetitive processes of the loop determination and to increase execution performance. In both the loops a1 and b1, an initial value of a control variable i of the loop is "1", an end value is "10", and an increment value is "1", which are the same. In a case of the increment value "1", description in the code is omitted.

Figure 6:
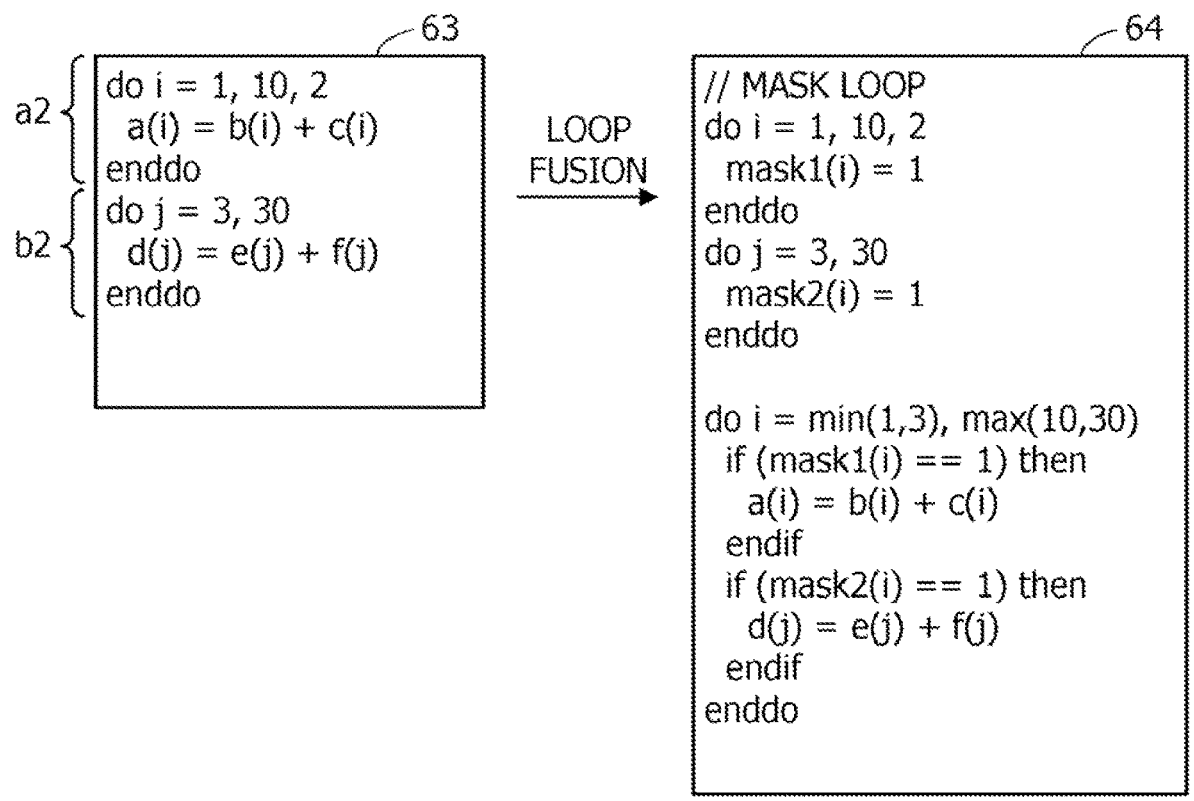
FIG. 6 is a diagram illustrating a second example of the loop fusion.

FIG. 6 is a diagram illustrating a second example of loop fusion.

For example, the optimization unit 144 may determine that the loop a2 and the loop b2 in a code 63 are available for fusion. In the loop a2, an initial value of the control variable i of the loop is "1", an end value is "10", and an increment value is "2". On the other hand, in the loop b2, an initial value of a control variable j of the loop is "3", an end value is "30", and an increment value is "1". For example, in the loops a2 and b2, acquirable values of the control variables of the loops are different from each other.

In this case, for example, the optimization unit 144 fuses the loop a2 and the loop b2 by using a mask variable "mask1 (i)" or a mask variable "mask2 (i)" to convert the code 63 into a code 64. The mask variable is used for a branch command in a loop after fusion. Meanwhile, when if statements using the mask variables are inserted as branch commands into the loop after fusion, efficient loop fusion may not be achieved.

Next, FIGS. 7A and 7B are diagrams illustrating an example of a loop fusion determination by the optimization unit 144.

FIGS. 7A and 7B are diagrams illustrating an example of a loop fusion determination from a viewpoint of a reduction loop.

A reduction or reduction operation is accumulation in iteration of the loop. The reduction loop is a loop including reduction. In the example in FIGS. 7A and 7B, a result of the reduction is substituted for a variable a.

FIG. 7A illustrates a code 71 including loops 1a and 2a that are available for loop fusion. In the code 71, there is a reduction in the loop 1a, and a in which a result of the reduction in the loop 1a is stored is not referred to in the loop 2a. Therefore, the optimization unit 144 determines that the loop 1a and the loop 2a are available for fusion.

FIG. 7B illustrates a code 72 including loop 1b and 2b that are not available for loop fusion. In the code 72, there is a reduction in the loop 1b. a in which a result of the reduction in the loop 1b is stored is referred to in the loop 2b. Therefore, the optimization unit 144 determines that the loop 1b and the loop 2b are not available for fusion.

FIGS. 8A and 8B are diagrams illustrating an example of a loop fusion determination from a viewpoint of a tight loop.

The tight loop is a loop that possesses an operation only in the innermost loop in a nested loop. In a case where an operation is included in a loop in the middle, a loop lower than the loop including the operation is regarded as a tight loop. For example, in the nested loop, the optimization unit 144 determines that a loop possessing an operation only in the innermost loop is a fusion candidate, and regards a loop lower than the loop including the operation as the tight loop and excludes the loop from the fusion candidate in a case where an operation is included in a loop in the middle.

FIG. 8A illustrates a code 73 including loops 1c and 2c that are available for loop fusion. Both of the loops 1c and 2c are tight loops. Therefore, the optimization unit 144 determines that the loop 1c and the loop 2c are available for fusion.

FIG. 8B illustrates a code 74 including loops 1d and 2d that are not available for loop fusion. The loop 2d is a tight loop. On the other hand, the loop 1d is not a tight loop since an arithmetic equation "c=d*i" exists outside the innermost loop. Therefore, the optimization unit 144 determines that the loop 1d and the loop 2d are not available for fusion.

Figure 9:
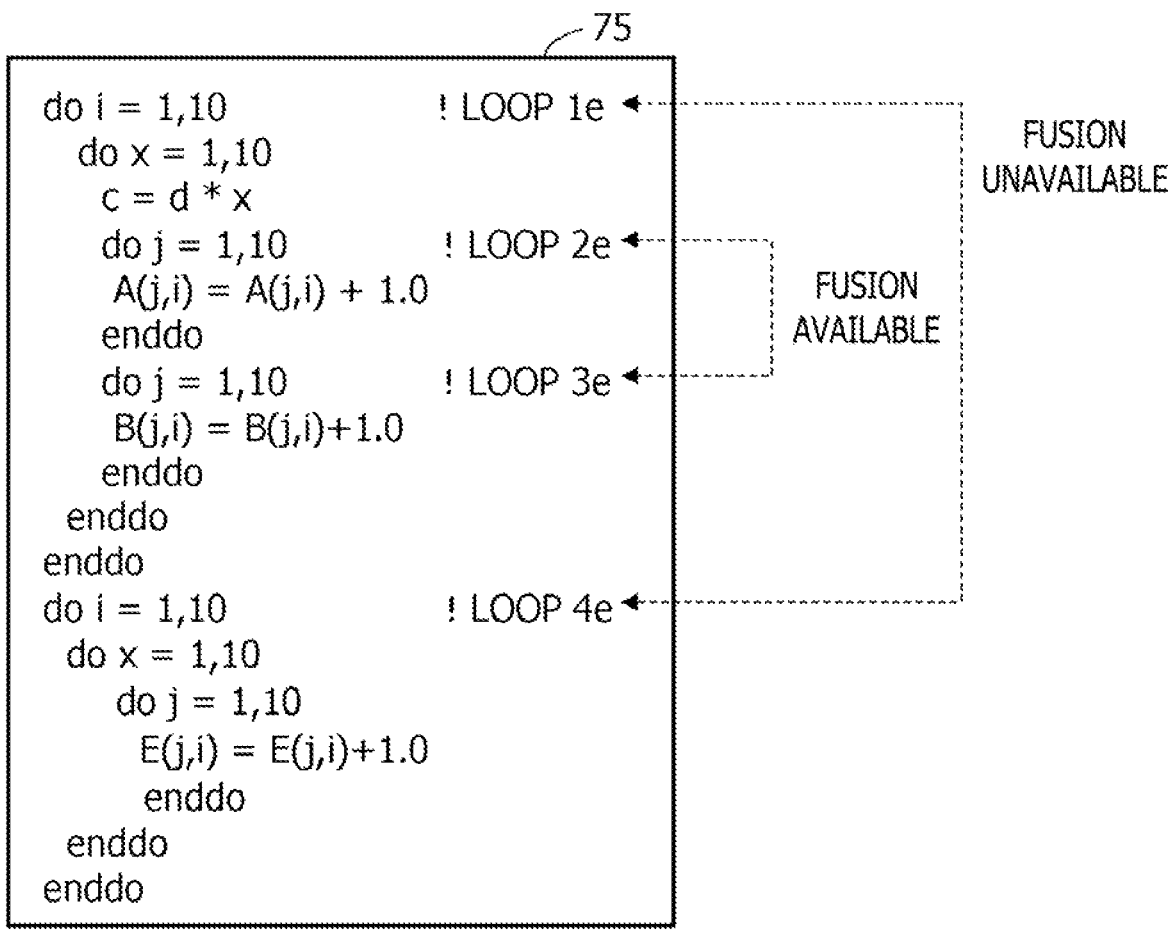
FIG. 9 is a diagram illustrating another example of the loop fusion determination from the viewpoint of the tight loop.

FIG. 9 is a diagram illustrating another example of the loop fusion determination from the viewpoint of the tight loop.

A code 75 includes loops 1e, 2e, 3e, and 4e. The loops 2e and 3e are inner loops of the loop 1e. The loop 1e is not a tight loop since an arithmetic equation "c=d*x" exists outside the innermost loop. Therefore, the optimization unit 144 determines that the loop 1e and the loop 4e are not available for fusion.

On the other hand, any of the loops 2e and 3e is a tight loop. Therefore, the optimization unit 144 determines that the loop 2e and the loop 3e are available for fusion.

FIGS. 10A and 10B are diagrams illustrating an example of a loop fusion determination from a viewpoint of data dependence.

FIG. 10A illustrates a code 81 including loop 1f and 2f that are available for loop fusion. Since in the loops 1f and 2f, A(j) and A(j+1) depend on each other, specifically, depend on each other in a forward direction, the optimization unit 144 determines that data is not corrupted even when the loops 1f and 2f are fused. Therefore, the optimization unit 144 determines that the loop 1f and the loop 2f are available for loop fusion.

FIG. 10B illustrates a code 82 including loops 1g and 2g that are not available for loop fusion. Since in the loops 1g and 2g, A(j+1) and A(j) depend on each other, specifically, depend on each other in a reverse direction, the optimization unit 144 determines that data corruption occurs when A(j+1) and A(j) are fused. Therefore, the optimization unit 144 determines that the loop 1g and the loop 2g are not available for loop fusion.

FIGS. 11A and 11B are diagrams illustrating another example of the loop fusion determination from the viewpoint of data dependence.

FIG. 11A illustrates a code 83 including loops 1h and 2h that are available for loop fusion. In the example of the code 83, in a case where a set of the loop 2h and the loop 3h is set as a fusion candidate, the optimization unit 144 determines that the loop 1h and the loop 2h do not have a dependence relationship since the loop 3h does not use a calculation result of the loop 2h. Therefore, the optimization unit 144 determines that the loop 1h and the loop 2h are available for loop fusion.

FIG. 11B illustrates a code 84 including loops 1i and 2i that are not available for loop fusion. In the example of the code 84, in a case where the loop 2i and the loop 3i are set as fusion candidates, the optimization unit 144 determines that the loop 1i and the loop 2i have a dependence relationship since the loop 3i uses a calculation result of the loop 2i. Therefore, the optimization unit 144 determines that the loop 1i and the loop 2i are not available for loop fusion.

Figure 12:
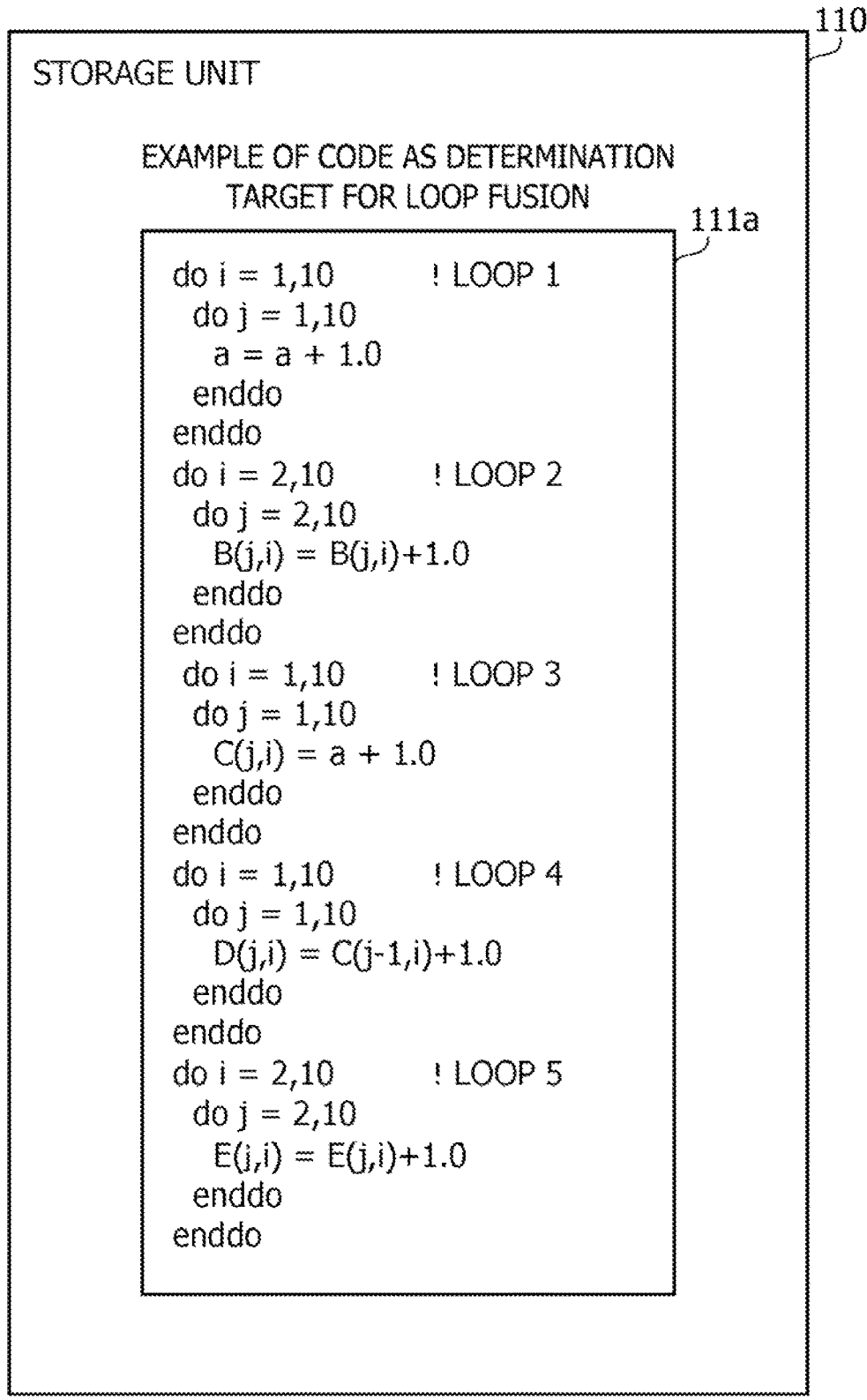
FIG. 12 is a diagram illustrating an example of a code as a determination target of loop fusion.

FIG. 12 is a diagram illustrating an example of a code as a determination target of loop fusion.

A source code 111a is an example of a code included in the source program 111. For example, the source code 111a includes 5 loops of loops 1 to 5. The optimization unit 144 extracts a combination of loops as a fusion candidate, from an intermediate language of the source code 111a generated by the intermediate language generation unit 143. In a case of the intermediate language of the source code 111a, the optimization unit 144 first extracts candidates with the loop 1 as a trigger, and sequentially makes determinations with the loops 2, 3, 4, and 5 as a trigger. For the description of the intermediate language (intermediate code), FIG. 12 of Japanese Laid-open Patent Publication No. 2014-228891 and the like may be referred to.

Figure 13:
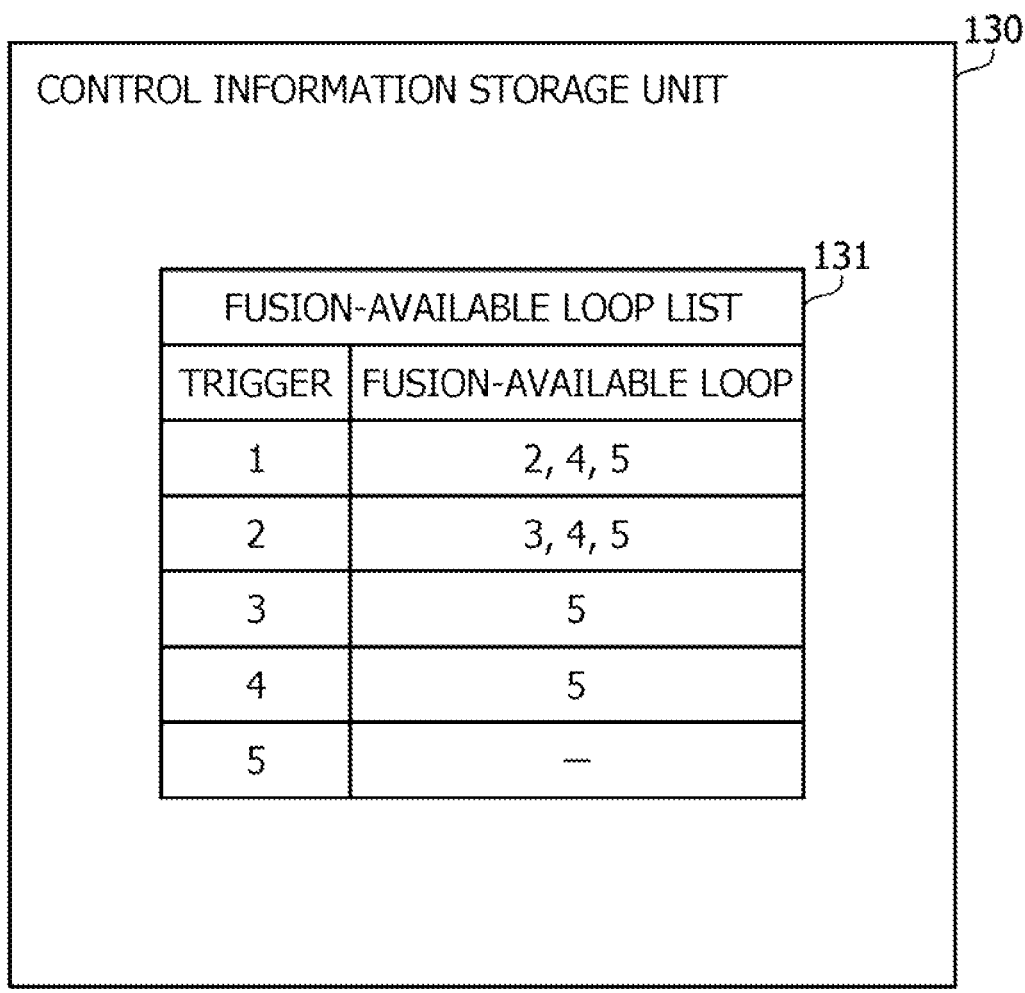
FIG. 13 is a diagram illustrating an example of a fusion-available loop list.

FIG. 13 is a diagram illustrating an example of a fusion-available loop list.

A fusion-available loop list 131 is generated by the optimization unit 144 and stored in the control information storage unit 130. The optimization unit 144 determines whether or not a loop of a trigger is available for fusion with another loop based on a structure of the loop such as a reduction loop or a tight loop described above, and sets the fusion-available loop list 131.

The fusion-available loop list 131 includes items of a trigger and a fusion-available loop. A number of a loop as the trigger is registered in the item of the trigger. A number of a loop that is available for fusion with the loop of the trigger is registered to the item of the fusion-available loop.

For example, a record including a trigger "1" and fusion-available loops "2, 4, 5" is registered in the fusion-available loop list 131. This record indicates that each of the loops 2, 4, and 5 is available for fusion with the loop 1. In the fusion-available loop list 131, fusion-available loops are registered for other triggers in the same manner.

FIG. 14 is a diagram illustrating an example of loop information.

Loop information 132 is generated by the optimization unit 144, and stored in the control information storage unit 130. The optimization unit 144 acquires variable information, the number of registers, a loop shape, and command information in each loop based on the intermediate language of the source code 111a, and records the variable information, the number of registers, the loop shape, and the command information in the loop information 132 for each loop.

The variable information is information on a variable used in a loop. The variable information includes variables (variables other than control variables of a loop) used for four fundamental operations and information on the last loop (existing loop) in which the variables exist. The information on the existing loop is used to identify a variable to be checked when checking a variable dependence relationship between loops. The variable information includes a variable to be used and flag information indicating whether or not the variable is a control variable of a loop. In the flag information indicating whether or not the variable is a control variable, "Yes" indicates that the variable is a control variable, and "No" indicates that the variable is not the control variable.

The number of registers is information on the number of integer registers and the number of floating-point registers used in the loop.

The loop shape is information of an initial value, an end value, and an increment value that represent acquirable values of the control variable of the loop.

The command information is information on the number of memory commands and the number of four fundamental operation commands. The memory command is a LOAD command or a STORE command. The four fundamental operation commands are an ADD command, a SUB command, a MULT command, and a DIV command. The numbers counted as the number of memory commands and the number of four fundamental operation commands may be the number of memory commands and the number of four fundamental operation commands for variables other than the control variable of the loop.

In the example of the loop 1, the optimization unit 144 records a variable "a" used for four fundamental operations of a floating-point number and a last loop "loop 3" in which the variable "a" exists, in the loop information 132. The optimization unit 144 respectively records flag information "No", "Yes", and "Yes" of control variables for use variable names "a", "i", and "j" in the loop information 132. The optimization unit 144 records, for example, an integer register "2" and a floating-point register "1" as the number of registers in the loop 1 in the loop information 132. The optimization unit 144 records, for example, an initial value "1", an end value "10", and an increment value "1" in the loop information 132 as the loop shape in the loop 1. The optimization unit 144 records, for example, the number "–" (none) of memory commands and the number "1" of four fundamental operation commands in the loop information 132, as the command information in the loop 1.

In the same manner, regarding the loop 2, the optimization unit 144 acquires variable information, the number of registers, a loop shape, and command information, and records the variable information, the number of registers, the loop shape, and the command information in the loop information 132.

FIG. 15 is a diagram illustrating the example of the loop information (following FIG. 14).

The optimization unit 144 also acquires variable information, the number of registers, a loop shape, and command information for the loops 3 and 4, and records the variable information, the number of registers, the loop shape, and the command information in the loop information 132.

FIG. 16 is a diagram illustrating the example of the loop information (following FIG. 15).

The optimization unit 144 also acquires variable information, the number of registers, a loop shape, and command information for the loop 5, and records the variable information, the number of registers, the loop shape, and the command information in the loop information 132.

FIG. 17 is a diagram illustrating an example of loop fusion candidate information.

Loop fusion candidate information 133 is generated by the optimization unit 144 based on the fusion-available loop list 131 and the loop information 132, and is stored in the control information storage unit 130. The loop fusion candidate information 133 is information indicating a necessity of a mask process, the number of variables, the number of registers, presence or absence of a variable dependence relationship, the number of memory commands, and the number of arithmetic commands, for each combination of loops of a fusion candidate with a trigger loop.

The optimization unit 144 extracts a combination of loops of the fusion candidate for each trigger based on the fusion-available loop list 131, and registers the combination in the loop fusion candidate information 133.

In the example of the fusion-available loop list 131, a fusion-available loop includes loops 2, 4, and 5, for a trigger "1". Therefore, the optimization unit 144 records the combinations of the loops "1, 2", "1, 4", and "1, 5" as candidates in the items of the loop in the loop fusion candidate information 133.

Next, the optimization unit 144 searches for the next fusion-available loop for the loop 2, 4, and 5 combined with the loop 1. For example, in the fusion-available loop list 131, a fusion-available loop "3" is descried for a trigger "2". Meanwhile, there is no loop 3 in the fusion-available loops of the trigger "1". Therefore, regarding the trigger "1", the optimization unit 144 does not put a combination including the loop 3 in the item of the loop of the loop fusion candidate information 133.

Next, in the fusion-available loop list 131, a fusion-available loop "4" is described for the trigger "2". The fusion-available loop of the trigger "1" includes the loop 4. Therefore, regarding the trigger "1", the optimization unit 144 records a combination of the loops "1, 2, 4" as a candidate in the item of the loop of the loop fusion candidate information 133. In the same manner, regarding the trigger "1", the optimization unit 144 records combinations of the loops "1, 2, 5", "1, 4, 5", and "1, 2, 4, 5" as candidates in the item of the loop in the loop fusion candidate information 133. Next, the optimization unit 144 moves to the trigger "2" and records a combination of the loops of the fusion candidate in the loop fusion candidate information 133 in the same manner, and repeats the process until there is no more trigger.

The information registered in the loop fusion candidate information 133 based on the loop information 132 will be described.

The necessity of the mask process is whether or not addition of the mask process using a mask variable is required at a time of fusion, and is "true" when required, and is "false" when not required. The mask process is a branch process added when a combination of loops having different initial values, end values, and increment values of control variables of the loops is fused.

The number of variables is a sum of the numbers of variables used in respective loops belonging to the corresponding loop combination.

The number of registers is a sum of the number of registers used in each loop belonging to the corresponding loop combination, and is obtained for each of integer registers and floating-point registers. In the drawing, the number of registers is described as "r1, r2". r1 is the number of integer registers. r2 is the number of floating-point registers.

The presence or absence of a variable dependence relationship is the presence or absence of a variable dependence relationship across loops in each loop belonging to the corresponding loop combination. As an example of the variable dependence relationship, for example, data dependence, the dependence relationship described in FIGS. 10A to 11B is considered. The dependence is "true", and the non-dependence is "false".

The number of memory commands is a sum of the number of memory commands in each loop belonging to the corresponding loop combination.

The number of arithmetic commands is a sum of the number of arithmetic commands in each loop belonging to the corresponding loop combination.

For example, regarding a combination of loops "1, 2" as a fusion candidate for a trigger "1", a record of a mask "true", the number of variables "2", the number of registers "4, 2", a dependence "false", the number of memory commands "2", and the number of arithmetic commands "2" are registered in the loop fusion candidate information 133. In this record, in a case where the combination of the loops "1, 2" is fused, the mask process is required to be added, and the number of variables other than control variables of the loops is "2", the number of integer registers is "4", the number of floating-point registers is "2", the number of memory commands is "2", and the number of arithmetic commands is "2". This record also indicates that there is no variable dependence relationship in the loops 1 and 2 belonging to the combination of the loops "1, 2".

In the same manner, for the other combinations for the trigger "1", the optimization unit 144 registers records of the mask, the number of variables, the number of registers, the dependence, the number of memory commands, and the number of arithmetic commands in the loop fusion candidate information 133.

In the same manner, for the combination of loops of the fusion candidate for the trigger "2", the optimization unit 144 registers records of the mask, the number of variables, the number of registers, the dependence, the number of memory commands, and the number of arithmetic commands in the loop fusion candidate information 133.

FIG. 18 is a diagram illustrating the example of the loop fusion candidate information (following FIG. 17).

In the same manner, for the combinations of loops of the fusion candidate for the triggers "3" and "4", the optimization unit 144 registers records of the mask, the number of variables, the number of registers, the dependence, the number of memory commands, and the number of arithmetic commands in the loop fusion candidate information 133.

For the trigger "5", no fusion-available loop exists in the fusion-available loop list 131. Therefore, the optimization unit 144 may not register information on the trigger "5" in the loop fusion candidate information 133.

Next, a processing procedure of the information processing apparatus 100 will be described.

Figure 19:
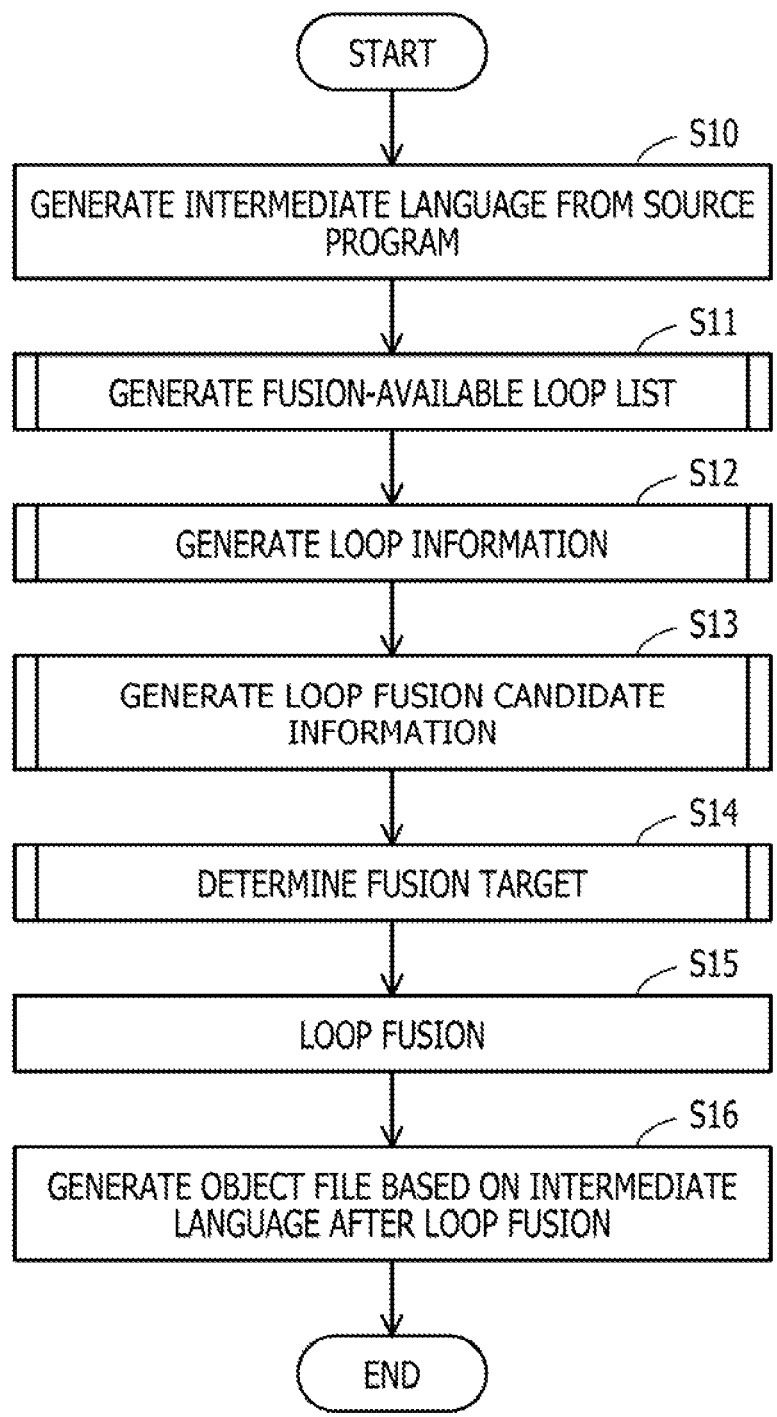
FIG. 19 is a flowchart illustrating an example of an entire process of compiling.

FIG. 19 is a flowchart illustrating an example of an entire process of compiling.

(S10) The intermediate language generation unit 143 acquires the source program 111 input by the source program input unit 141 from the input and output control unit 142, and generates an intermediate language for the source program 111. The source program 111 includes, for example, the source code 111a illustrated in FIG. 12. The intermediate language generation unit 143 stores the generated intermediate language in the intermediate language storage unit 120.

(S11) The optimization unit 144 generates the fusion-available loop list 131, based on the intermediate language stored in the intermediate language storage unit 120, and stores the generated fusion-available loop list 131 in the control information storage unit 130. Details of the fusion-available loop list generation will be described below.

(S12) The optimization unit 144 generates the loop information 132, based on the intermediate language stored in the intermediate language storage unit 120, and stores the generated loop information 132 in the control information storage unit 130. Details of the loop information generation will be described below.

(S13) The optimization unit 144 generates the loop fusion candidate information 133, based on the fusion-available loop list 131 and the loop information 132 stored in the control information storage unit 130, and stores the generated loop fusion candidate information 133 in the control information storage unit 130. Details of the loop fusion candidate information generation will be described below.

(S14) The optimization unit 144 determines a combination of loops as a fusion target, based on the loop fusion candidate information 133 stored in the control information storage unit 130. Details of the fusion target determination will be described below.

(S15) The optimization unit 144 generates an intermediate language after loop fusion by performing the loop fusion on the combination of the loops as the fusion target determined in step S14, for the intermediate language stored in the intermediate language storage unit 120. In a case where the loop fusion is performed on the combination of loops for which a mask is "true" in the loop fusion candidate information 133, the optimization unit 144 performs the loop fusion by adding a mask process to a loop initialization process.

(S16) The code generation unit 145 generates an assembly language based on the intermediate language after the loop fusion, and outputs the assembly language to the input and output control unit 142. The object file output unit 146 acquires the generated assembly language from the input and output control unit 142, and generates the object file 112 based on the assembly language. The object file output unit 146 stores the generated object file 112 in the storage unit 110. The compiling is completed.

Figure 20:
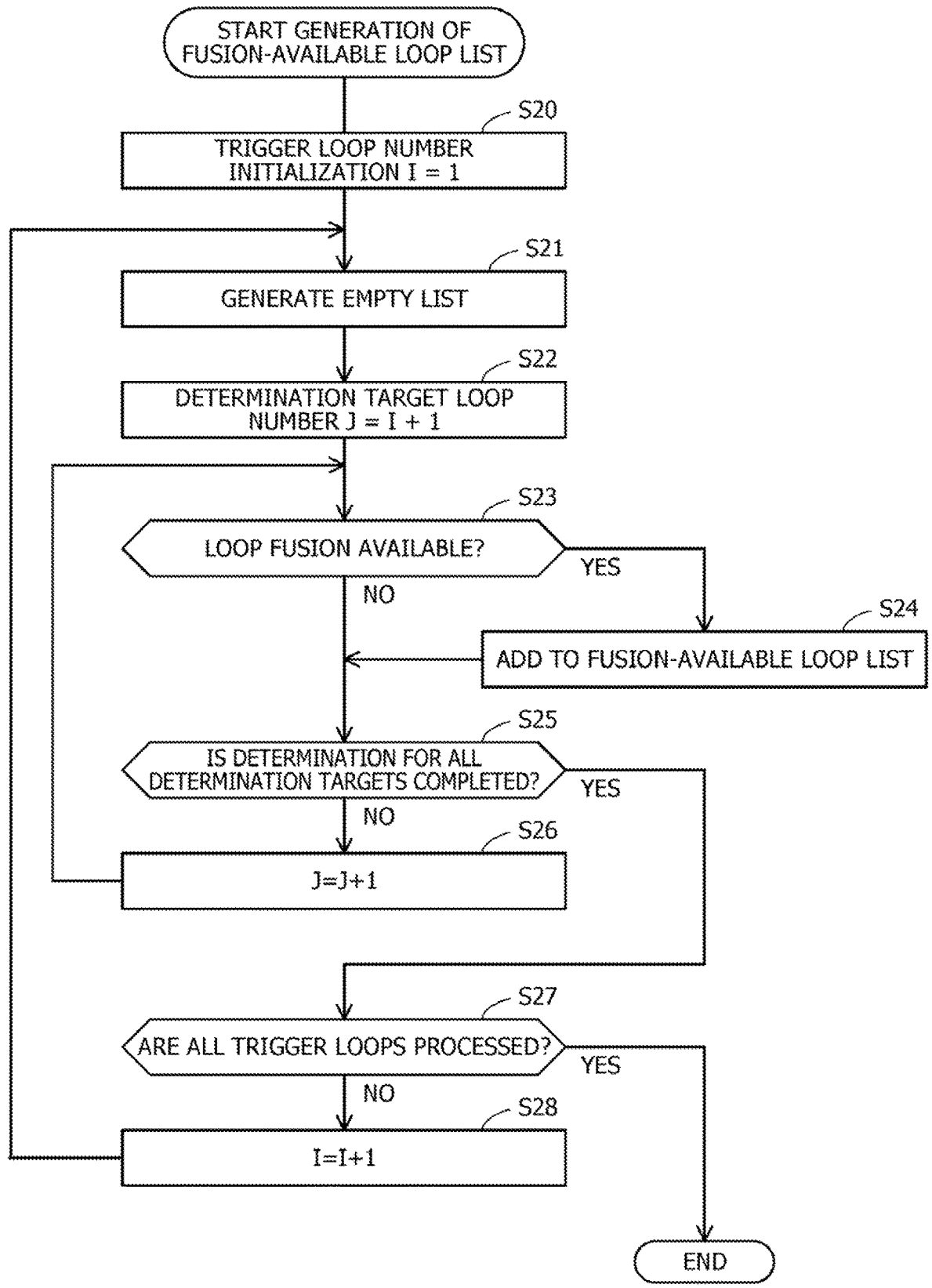
FIG. 20 is a flowchart illustrating an example of a fusion-available loop list generation.

FIG. 20 is a flowchart illustrating an example of a fusion-available loop list generation.

The fusion-available loop list generation corresponds to step S11.

(S20) The optimization unit 144 initializes a trigger loop number I. For example, the optimization unit 144 initializes I=1.

(S21) The optimization unit 144 generates an empty list that is a template of the fusion-available loop list 131, and stores the empty list in the control information storage unit 130.

(S22) The optimization unit 144 sets a determination target loop number J to J=I+1.

(S23) The optimization unit 144 determines whether or not the loop I and the loop J included in the intermediate language are available for fusion, based on a loop structure such as a reduction loop or a tight loop. In a case where the fusion is available, the process proceeds to step S24. In a case where the fusion is not available, the process proceeds to step S25.

(S24) The optimization unit 144 adds the fusion-available loop J to the fusion-available loop list 131 for the trigger loop number I. The process proceeds to step S25.

(S25) The optimization unit 144 determines whether or not the fusion availability is determined for all the determination targets for the trigger loop number I. In a case where the determination target loop number J reaches the last loop number, the determination is completed for all the determination targets. In a case where the determination is completed for all the determination targets, the process proceeds to step S27. In a case where the determination is not completed for all the determination targets, the process proceeds to step S26.

(S26) The optimization unit 144 increments J. For example, the optimization unit 144 sets J=J+1. The process proceeds to step S23.

(S27) The optimization unit 144 determines whether or not all the trigger loops are processed. In a case where the trigger loop number I reaches the last loop number, all the trigger loops are processed. In a case where all the trigger loops are processed, the fusion-available loop list generation is completed. In a case where all the trigger loops are not processed, the process proceeds to step S28.

(S28) The optimization unit 144 increments I. For example, the optimization unit 144 sets I=I+1. The process proceeds to step S21.

Figure 21:
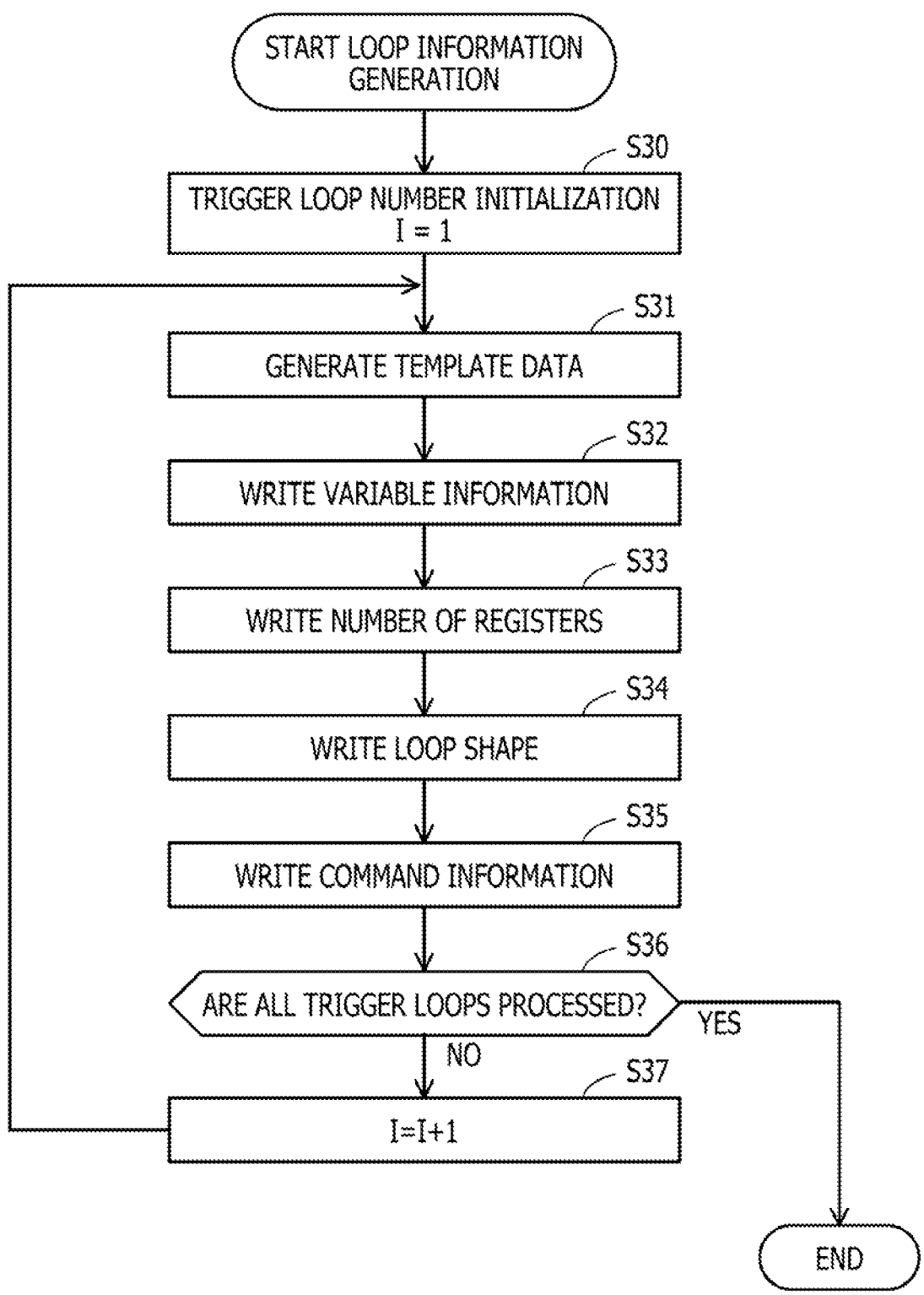
FIG. 21 is a flowchart illustrating an example of a loop information generation.

FIG. 21 is a flowchart illustrating an example of a loop information generation.

The loop information generation corresponds to step S12.

(S30) The optimization unit 144 initializes the trigger loop number I. For example, the optimization unit 144 initializes I=1.

(S31) The optimization unit 144 generates template data of the loop information 132, and stores the template data in the control information storage unit 130.

(S32) The optimization unit 144 acquires variable information of the loop I based on the intermediate language, and writes the variable information in the loop information 132.

(S33) The optimization unit 144 acquires the number of registers of the loop I based on the intermediate language, and writes the number of registers in the loop information 132. The optimization unit 144 acquires the number of registers separately for an integer register and a floating-point register.

(S34) The optimization unit 144 acquires a loop shape of the loop I, for example, an initial value, an end value, and an increment value of a control variable based on the intermediate language, and writes the loop shape in the loop information 132.

(S35) The optimization unit 144 acquires command information of the loop I based on the intermediate language, and writes the command information in the loop information 132. The optimization unit 144 acquires the number of memory commands and the number of arithmetic commands as the command information.

(S36) The optimization unit 144 determines whether or not all the trigger loops are processed. In a case where all the trigger loops are processed, the loop information generation is completed. In a case where all the trigger loops are not processed, the process proceeds to step S37.

(S37) The optimization unit 144 increments I. For example, the optimization unit 144 sets I=I+1. The process proceeds to step S31.

Figure 22:
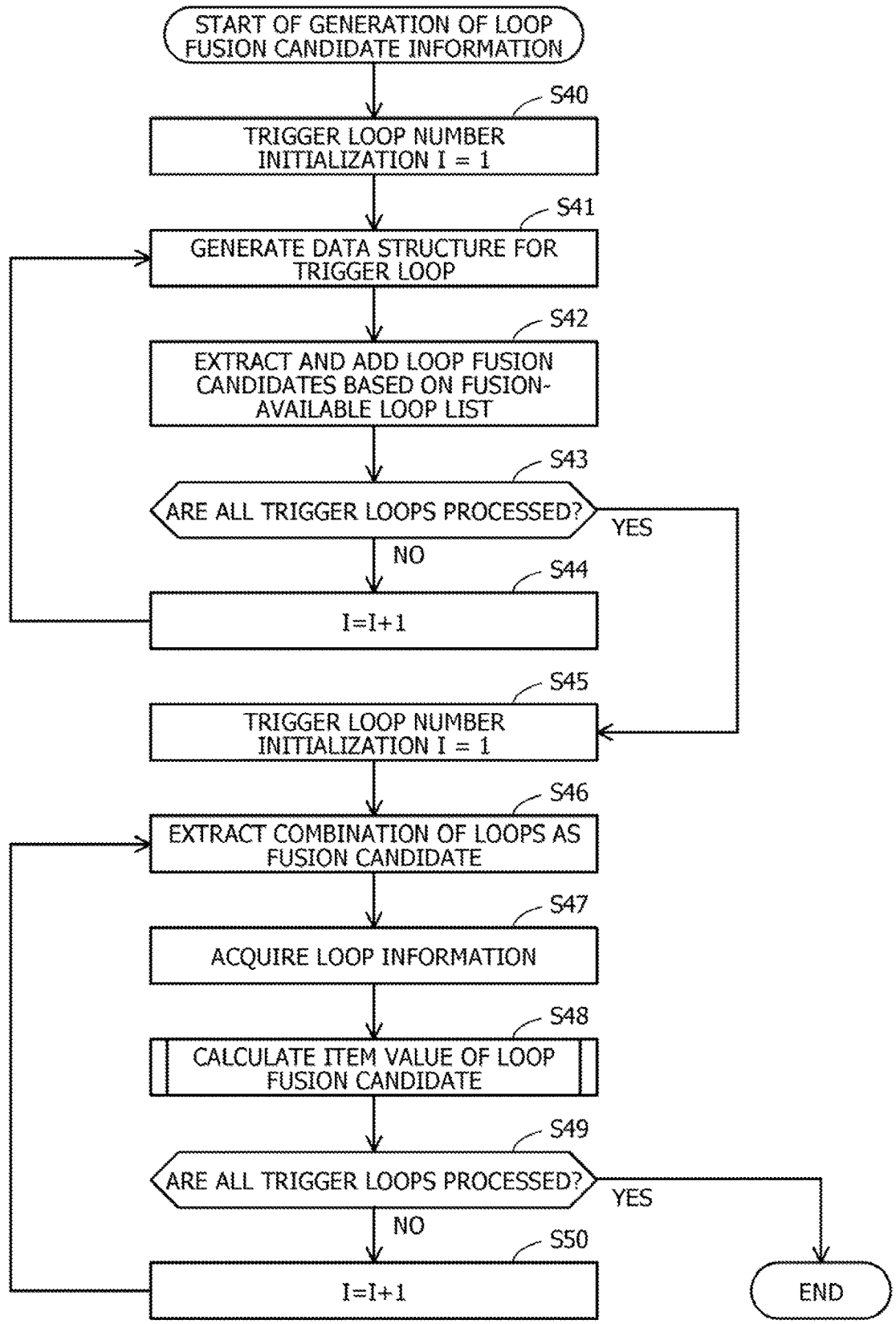
FIG. 22 is a flowchart illustrating an example of a loop fusion candidate information generation.

FIG. 22 is a flowchart illustrating an example of a loop fusion candidate information generation.

The loop fusion candidate information generation corresponds to step S13.

(S40) The optimization unit 144 initializes the trigger loop number I. For example, the optimization unit 144 initializes I=1.

(S41) The optimization unit 144 generates a data structure of a template of the loop fusion candidate information 133 for the trigger loop I, and stores the data structure in the control information storage unit 130.

(S42) The optimization unit 144 extracts a combination of loops of a loop fusion candidate for the corresponding trigger loop I based on the fusion-available loop list 131, and adds the combination to an item of the loop of the loop fusion candidate information 133.

(S43) The optimization unit 144 determines whether or not all the trigger loops are processed. In a case where all the trigger loops are processed, the process proceeds to step S45. In a case where all the trigger loops are not processed, the process proceeds to step S44.

(S44) The optimization unit 144 increments I. For example, the optimization unit 144 sets I=I+1. The process proceeds to step S41.

(S45) The optimization unit 144 initializes the trigger loop number I. For example, the optimization unit 144 initializes I=1.

(S46) Regarding the trigger loop I, the optimization unit 144 extracts one combination of loops as a fusion candidate from the loop fusion candidate information 133.

(S47) The optimization unit 144 acquires information on a loop belonging to the extracted combination from the loop information 132.

(S48) Based on the information acquired in step S47, the optimization unit 144 calculates item values including the number of variables, the number of registers, the number of memory commands, and the number of arithmetic commands for the combination of the loops of the loop fusion candidate, and registers the item values in the loop fusion candidate information 133. Details of the item value calculation for the loop fusion candidate will be described below.

(S49) The optimization unit 144 determines whether or not all the trigger loops are processed. In a case where all the trigger loops are processed, the loop fusion candidate information generation is completed. In a case where all the trigger loops are not processed, the process proceeds to step S50.

(S50) The optimization unit 144 increments I. For example, the optimization unit 144 sets I=I+1. The process proceeds to step S46.

Figure 23:
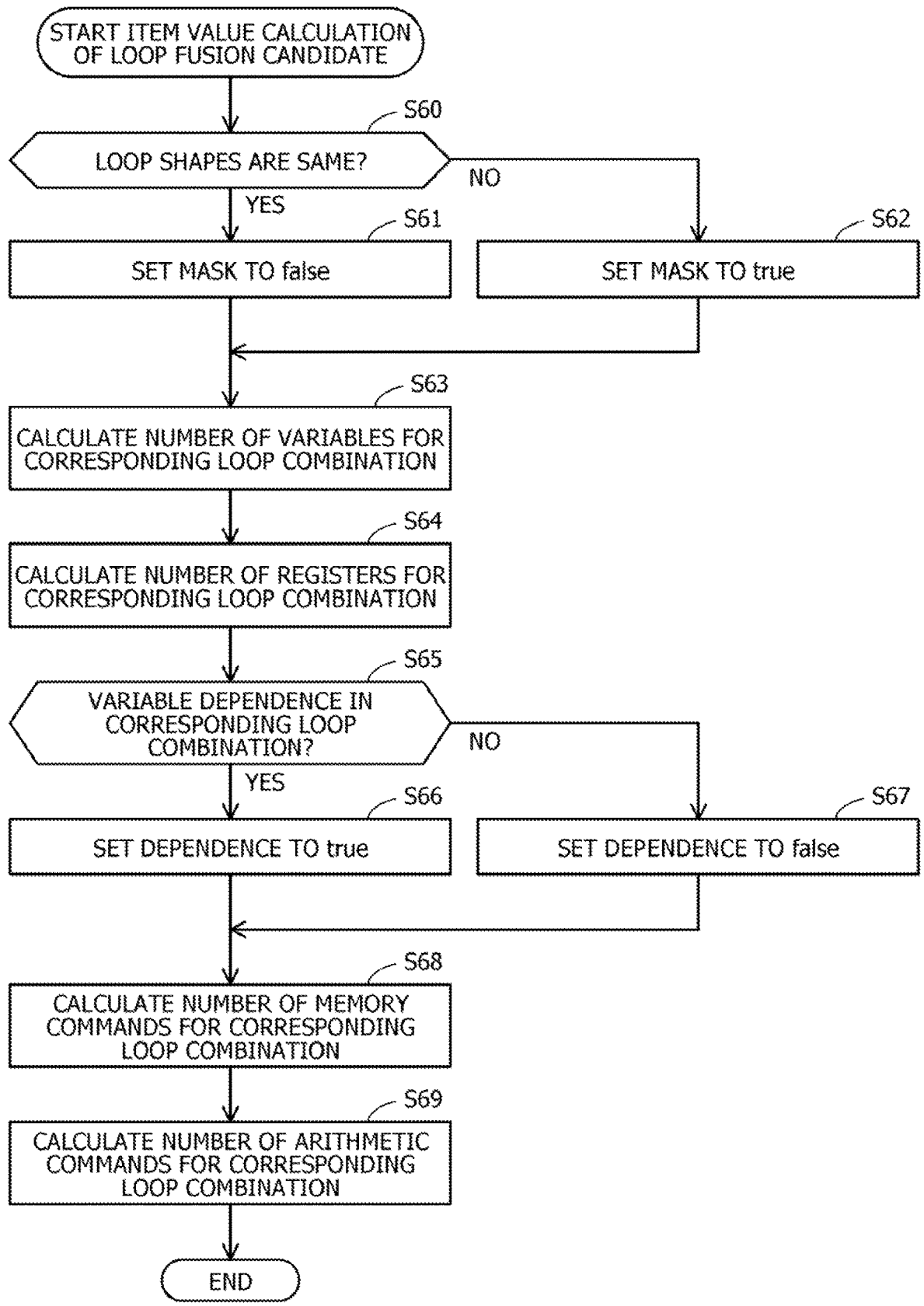
FIG. 23 is a flowchart illustrating an example of an item value calculation of a loop fusion candidate.

FIG. 23 is a flowchart illustrating an example of an item value calculation of a loop fusion candidate.

The item value calculation of the loop fusion candidate corresponds to step S48.

(S60) The optimization unit 144 determines whether or not the loop shapes, for example, the initial values, the end values, and the increment values of the control variable of the loop are the same for all loops belonging to the corresponding loop combination. In a case where the loop shapes are the same in all the corresponding loops, the process proceeds to step S61. In a case where the loop shapes are not the same in at least one of the loops, the process proceeds to step S62.

(S61) The optimization unit 144 sets the item of the mask in the loop fusion candidate information 133 to "false" for the corresponding loop combination. The process proceeds to step S63.

(S62) The optimization unit 144 sets the item of the mask in the loop fusion candidate information 133 to "true" for the corresponding loop combination. The process proceeds to step S63.

(S63) The optimization unit 144 calculates the number of variables for the corresponding loop combination, and sets the calculation result in the item of the number of variables in the loop fusion candidate information 133. The optimization unit 144 calculates a sum of the numbers of variables other than the loop control variable in the loops belonging to the corresponding combination acquired from the loop information 132 as the number of variables corresponding to the combination.

(S64) The optimization unit 144 calculates the number of registers for the corresponding loop combination, and sets the calculation result in the item of the number of registers in the loop fusion candidate information 133. The optimization unit 144 calculates, as the number of registers corresponding to the combination, a sum of the number of integer registers and a sum of the number of floating-point registers in the loop belonging to the corresponding combination, which are acquired from the loop information 132.

(S65) The optimization unit 144 determines whether or not variables have dependence in the corresponding loop combination. In a case where the variables have dependence, the process proceeds to step S66. In a case where the variables do not have dependence, the process proceeds to step S67. Examples of the dependence of the variable include the data dependence described with reference to FIGS. 10A to 11B.

(S66) The optimization unit 144 sets the item of dependence in the loop fusion candidate information 133 to "true" for the corresponding loop combination. The process proceeds to step S68.

(S67) The optimization unit 144 sets the item of dependence in the loop fusion candidate information 133 to "false" for the corresponding loop combination. The process proceeds to step S68.

(S68) The optimization unit 144 calculates the number of memory commands for the corresponding loop combination, and sets the calculation result in the item of the number of memory commands in the loop fusion candidate information 133. The optimization unit 144 calculates a sum of the numbers of memory commands in the loops belonging to the corresponding combination acquired from the loop information 132 as the number of memory commands corresponding to the combination.

(S69) The optimization unit 144 calculates the number of arithmetic commands for the corresponding loop combination, and sets the calculation result in the item of the number of arithmetic commands in the loop fusion candidate information 133. The optimization unit 144 calculates a sum of the numbers of arithmetic commands in the loops belonging to the corresponding combination acquired from the loop information 132 as the number of arithmetic commands corresponding to the combination. The item value calculation for the loop fusion candidate is completed.

Figure 24:
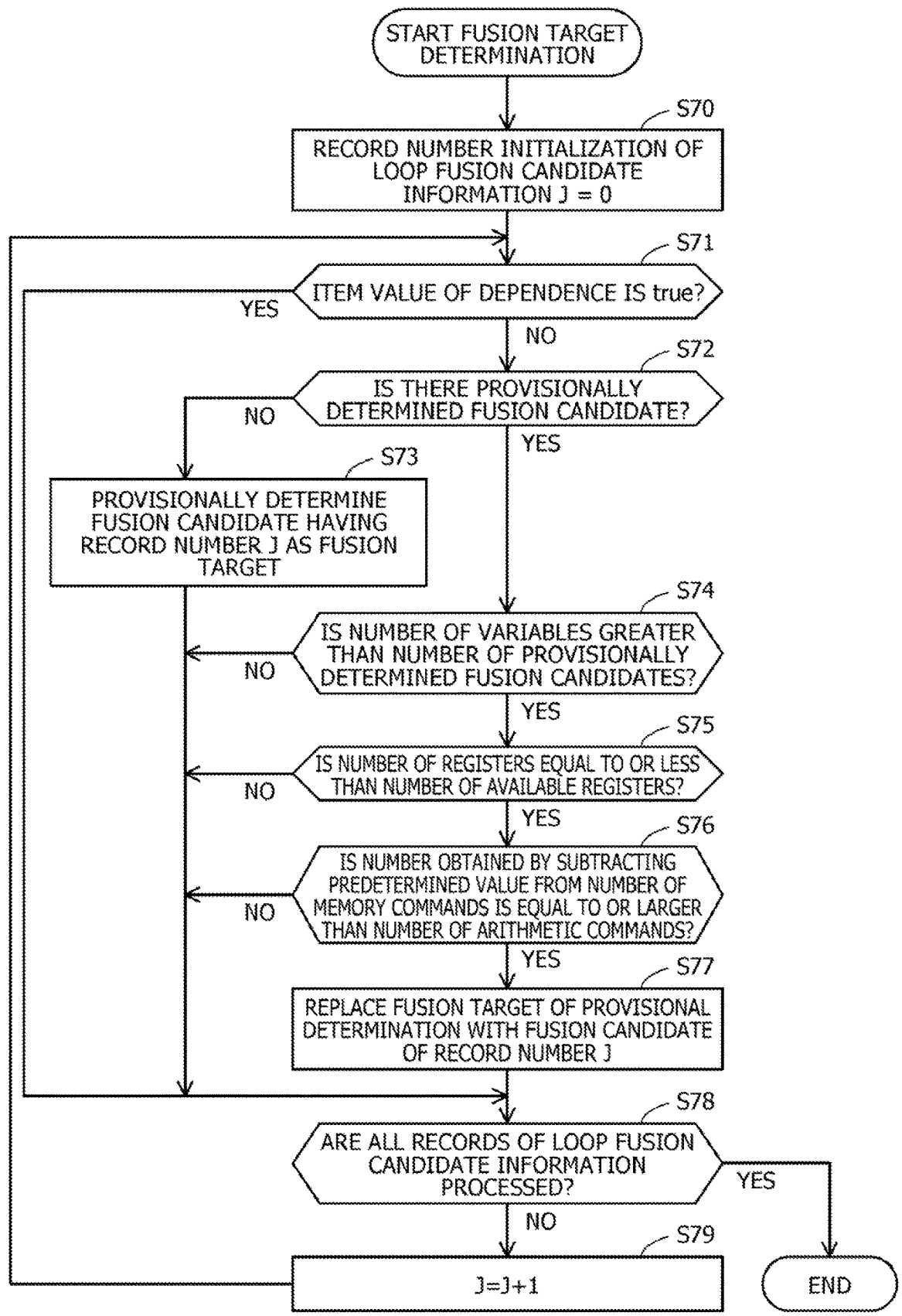
FIG. 24 is a flowchart illustrating an example of a fusion target determination.

FIG. 24 is a flowchart illustrating an example of a fusion target determination.

The fusion target determination corresponds to step S14.

(S70) The optimization unit 144 initializes the record number J of the loop fusion candidate information 133. For example, the optimization unit 144 initializes J=0. The record number J identifies one combination of loops of a fusion candidate in the loop fusion candidate information 133.

(S71) Based on the loop fusion candidate information 133, the optimization unit 144 determines whether or not an item value of dependence on the corresponding loop combination is "true". In a case where the item value of the dependence is "true", the process proceeds to step S78. In a case where the item value of the dependence is "false", the process proceeds to step S72.

(S72) The optimization unit 144 determines whether or not there is a fusion candidate provisionally determined as a loop fusion target. In a case where there is the provisionally determined fusion candidate, the process proceeds to step S74. In a case where there is no provisionally determined fusion candidate, the process proceeds to step S73.

(S73) The optimization unit 144 provisionally determines, as a fusion target, a combination of loops of a fusion candidate of the record number J. The process proceeds to step S78.

(S74) Based on the loop fusion candidate information 133, the optimization unit 144 determines whether or not the number of variables corresponding to a combination of loops of the record number J is larger than the number of variables corresponding to the provisionally determined fusion candidates. In a case where the number of variables corresponding to the combination of the loops of the record number J is larger than the number of variables corresponding to the provisionally determined fusion candidates, the process proceeds to step S75. In a case where the number of variables corresponding to the combination of the loops of the record number J is equal to or smaller than the number of variables corresponding to the provisionally determined fusion candidates, the process proceeds to step S78.

(S75) Based on the loop fusion candidate information 133, the optimization unit 144 determines whether or not the number of registers corresponding to the combination of the loops of the record number J is equal to or smaller than the number of available registers in an apparatus scheduled to execute the execution file 113 including the object file 112. In a case where the number of registers corresponding to the combination is equal to or less than the number of available registers, the process proceeds to step S76. In a case where the number of registers corresponding to the combination is larger than the number of available registers, the process proceeds to step S78.

The number of available registers in the apparatus scheduled to execute the execution file 113 is preset in the control information storage unit 130. The number of available registers is a number corresponding to the number of physical registers included in the corresponding apparatus, and is set for each of integer registers and floating-point registers. For example, the optimization unit 144 determines whether or not each of the number of integer registers and the number of floating-point registers is equal to or less than the number of available registers. In a case where both the number of integer registers and the number of floating-point registers are equal to or less than the number of available registers, the process proceeds to step S76. On the other hand, in a case where at least one of the number of integer registers and the number of floating-point registers is larger than the number of available registers, the optimization unit 144 advances the process to step S78. The apparatus scheduled to execute the execution file 113 may be the information processing apparatus 100.

(S76) Based on the loop fusion candidate information 133, the optimization unit 144 determines whether or not a number obtained by subtracting a predetermined value from the number of memory commands corresponding to the combination of the loops of the record number J is equal to or larger than the number of arithmetic commands corresponding to the combination. In a case where the number obtained by subtracting the predetermined value from the number of memory commands is equal to or larger than the number of arithmetic commands corresponding to the combination, the process proceeds to step S77. In a case where the number obtained by subtracting the predetermined value from the number of memory commands is smaller than the number of arithmetic commands corresponding to the combination, the process proceeds to step S78.

The predetermined value used in step S76 is determined in advance in accordance with, for example, the number of memory commands that are simultaneously executable by a plurality of arithmetic elements included in the apparatus scheduled to execute the execution file 113. For example, in a case where the number of memory commands that are simultaneously executable by the plurality of arithmetic elements included in the apparatus is "2", it is considered that the predetermined value used in step S76 is set to "2". Alternatively, for example, in a case where the number of memory commands that are simultaneously executable is "1", it is considered that the predetermined value used in step S76 is set to "1". In order to execute the arithmetic command, the optimization unit 144 subtracts the number of memory commands that may be simultaneously executed first from the number of memory commands in the loop fusion candidate information 133, and then compares the number of memory commands with the number of arithmetic commands since the memory command is executed before the execution of the arithmetic command.

(S77) The optimization unit 144 replaces the provisionally determined fusion target with a fusion candidate of the record number J. For example, the optimization unit 144 provisionally determines the combination of the loops of the fusion candidate of the record number J as a fusion target, and cancels the provisional determination for the fusion candidate provisionally determined before step S77.

(S78) The optimization unit 144 determines whether or not all records of the loop fusion candidate information 133 are processed. In a case where the record number J reaches the last record number, all the records are processed. In a case where all the records are processed, the optimization unit 144 determines the combination of the loops provisionally determined at the stage of step S78 as the fusion target, and the fusion target determination is completed. In a case where all the records are not processed, the process proceeds to step S79.

(S79) The optimization unit 144 increments J. For example, the optimization unit 144 sets J=J+1. The process proceeds to step S71.

FIG. 25 is a diagram illustrating an example of a determination result of a loop fusion target.

Regarding the loop fusion candidate information 133 illustrated in FIGS. 17 and 18, the optimization unit 144 determines, for example, a combination of the loops "1, 2, 4, 5" as a loop fusion target by the procedure in FIG. 24. The combination of the loop "1, 2, 4, 5" is a mask "true" in the loop fusion candidate information 133. Therefore, the optimization unit 144 performs loop fusion for the combination of the loops "1, 2, 4, 5" by adding a mask process to a loop initialization process.

As described above, the optimization unit 144 preferentially determines, as the loop fusion target, a combination having a large number of variables, which is a combination of loops in which the number of registers is equal to or smaller than the number of available registers, and the number of memory commands and the number of arithmetic commands are included in a well-balanced manner.

Thus, it is possible to achieve suppression of spilling and filling of data of the memory due to register shortage, and efficient use of the arithmetic element. In each cycle when the corresponding loop in the execution file 113 is executed, a plurality of commands may be effectively allocated to a plurality of arithmetic elements, and processing performance may be improved. For example, a processing speed of the fused loop may be improved as compared with the case where the loop fusion is not performed. The register may be effectively used.

FIG. 26 is a diagram illustrating another example of the code as the determination target of loop fusion.

A source code 111b is an example of a code included in the source program 111. For example, the source code 111b includes 3 loops of loops 1j, 2j, and 3j. The optimization unit 144 extracts a combination of loops as a fusion candidate, from an intermediate language of the source code 111b generated by the intermediate language generation unit 143. The loops 1j and 2j have the same loop shape. Meanwhile, in the loops 1j and 2j, B1 obtained in the loop 1j is used in the loop 2j, and a dependence relationship between variables is high.

The loops 1j and 3j have different loop shapes. The loops 2j and 3j have different loop shapes.

Regarding the source code 111b, for example, the optimization unit 144 fuses a combination of the loops 1j and 3j having the different loop shapes.

FIG. 27 is a diagram illustrating an example of a code after loop fusion.

A source code 111c indicates the code after fusion in the case where the loops 1j and 3j in the source code 111b are fused, based on a source code. The optimization unit 144 generates an intermediate language corresponding to the source code 111c by applying loop fusion to the intermediate language of the source code 111b. The source code 111c indicates an example in which a process of obtaining an end value of the loop after fusion or a process of generating a mask used for the loop after fusion is added.

Next, an example of command scheduling for a loop after fusion in a case where the loop fusion illustrated in FIG. 27 is performed will be described.

FIG. 28 is a diagram illustrating an example of command scheduling.

A table 201 illustrates an example of allocation of commands to each arithmetic element in each cycle for the loop after fusion illustrated in FIG. 27. It is assumed that the number of arithmetic elements is 4 and the number of memory commands that are simultaneously executable is 2. One column described under an item of the arithmetic element corresponds to one arithmetic element. As an example, it is assumed that a latency of a LOAD command for performing loading from a register to a memory is 8 T, and a latency of a SUB command for performing subtraction is 4 T. T is a time per 1 cycle. The address calculation of the memory is omitted.

A numerical value such as "(1)" enclosed in parentheses in the table 201 represents a process executed for a command allocated to one arithmetic element in the corresponding cycle. For example, the numerical value enclosed in parentheses is processed as follows.

(1) The first arithmetic element loads V (k, i, j).
(2) The second arithmetic element loads V (k−1, i, j).
(3) The third arithmetic element subtracts a result of (2) from a result of (1).
(4) The first arithmetic element loads V (k+1, i, j).
(5) The second arithmetic element loads V (k−2, i, j).
(6) The third arithmetic element subtracts a result of (5) from a result of (4).
(7) The third arithmetic element subtracts a result of (6) from a result of (3).
(8) The first arithmetic element stores a result of (7) in A1.
(9) The first arithmetic element loads A1 (k, i, j).
(17) The first arithmetic element loads D2 (k, i, j).
(18) The second arithmetic element loads D2 (k−1, i, j).
(19) The fourth arithmetic element subtracts a result of (18) from a result of (17).
(20) The first arithmetic element loads D2 (k+1, i, j).
(21) The second arithmetic element loads D2 (k−2, i, j).
(22) The fourth arithmetic element subtracts a result of (21) from a result of (20).
(23) The fourth arithmetic element subtracts a result of (22) from a result of (19).
(24) The fourth arithmetic element stores a result of (23) in D1.

A schedule for executing each process in the table 201 is as follows.

(1) and (2) are executed in a first cycle. (4) and (5) are executed in a second cycle. (17) and (18) are executed in a third cycle. (20) and (21) are executed in a fourth cycle. (3) is executed in a ninth cycle. (6) and (19) are executed in a tenth cycle. (22) is executed in an eleventh cycle. (7) is executed in a fourteenth cycle. (23) is executed in a fifteenth cycle. (8) is executed in a seventeenth cycle. (9) and (24) are executed in an eighteenth cycle. In FIG. 28, a process related to B1 in a nineteenth and subsequent cycles is omitted.

In this manner, by the loop fusion, it is possible to perform arithmetic operations related to A1 and D1 in 18 cycles, and it may be seen that the arithmetic elements are effectively used as compared with the comparative example in FIGS. 29 and 30 described below.

Next, a comparative example of command scheduling in a case where the loops 1j and 2j of the source code 111b are fused will be described.

FIG. 29 is a diagram illustrating a comparative example of command scheduling.

A source code 91 indicates a code example in a case where the loops 1j and 2j are fused.

A table 202 illustrates an example of allocation of commands to each arithmetic element in each cycle for the loop after fusion in the case where the loops 1j and 2j are fused. In the same manner as FIG. 28, it is assumed that the number of arithmetic elements is 4 and the number of memory commands that are simultaneously executable is 2. One column described under an item of the arithmetic element corresponds to one arithmetic element. As an example, it is assumed that a latency of the LOAD command is 8 T and a latency of the SUB command is 4 T. In the table 202, numerical values enclosed in parentheses are processed as follows.

(1) The first arithmetic element loads V (k, i, j).
(2) The second arithmetic element loads V (k−1, i, j).
(3) The third arithmetic element subtracts a result of (2) from a result of (1).
(4) The first arithmetic element loads V (k+1, i, j).
(5) The second arithmetic element loads V (k−2, i, j).
(6) The third arithmetic element subtracts a result of (5) from a result of (4).
(7) The third arithmetic element subtracts a result of (6) from a result of (3).
(8) The first arithmetic element stores a result of (7) in A1.
(9) The first arithmetic element loads A1 (k, i, j).

In FIG. 29, the process from the nineteenth cycle to the thirty-fifth cycle related to B1 is omitted.

FIG. 30 is a diagram illustrating the comparative example (following FIG. 29) of the command scheduling.

(17) The first arithmetic element loads B1 (k, i, j).
(18) The second arithmetic element loads B1 (k−1, i, j).
(19) The third arithmetic element subtracts a result of (18) from a result of (17).
(20) The first arithmetic element loads B1 (k+1, i, j).
(21) The second arithmetic element loads B1 (k−2, i, j).
(22) The third arithmetic element subtracts a result of (21) from a result of (20).
(23) The third arithmetic element subtracts a result of (22) from a result of (19).
(24) The first arithmetic element stores a result of (23) in C1.

A schedule for executing each process in the table 202 is as follows. (1) and (2) are executed in a first cycle. (4) and (5) are executed in a second cycle. (3) is executed in a ninth cycle. (6) is executed in a tenth cycle. (7) is executed in a fourteenth cycle. (8) is executed in a seventeenth cycle. (9) is executed in an eighteenth cycle. In nineteenth to thirty-fifth cycles, the process related to B1 is executed. (17) and (18) are executed in a thirty-sixth cycle. (20) and (21) are executed in a thirty-seventh cycle. (19) is executed in a forty-fourth cycle. (22) is executed in a forty-fifth cycle. (23) is executed in a forty-ninth cycle. (24) is executed in a fifty-second cycle. The number of cycles required for the process of B1 is the same as the case in FIG. 28 and the cases in FIGS. 29 and 30.

In this manner, when the loops 1j and 2j are fused, it takes 52 cycles until the processes of C1 are finished. Since the operation result of the loop 1j is used in the loop 2j, the operation of the loop 2j waits until the operation of the loop 1j is finished, and loop fusion in which a parallelism of command execution may not be increased is performed. Therefore, even when the loops 1j and 2j are fused, the arithmetic elements are not sufficiently used in each cycle since the arithmetic elements are relatively empty, and efficient loop fusion may not be performed. With the loop fusion, registers may become insufficient, memory accesses for spilling or filling may increase, and performance may be degraded.

On the other hand, as illustrated in FIG. 28, according to the information processing apparatus 100, it is possible to improve use efficiency of the arithmetic element, and improve processing performance at the time of execution of the loop process. For example, it is possible to increase a parallelism of command execution for the loops 1j and 3j so that arithmetic operations exceeding the actual number of arithmetic elements are not simultaneously performed, and it is possible to effectively shorten the number of cycles required to execute the loop process. It is possible to suppress memory accesses of spilling and filling due to insufficient registers. As a result, a processing speed may be improved.

According to the information processing apparatus 100, a combination of loops having different loop shapes, for example, loops having different initial values, end values, and increment values of control variables may be set as a fusion target. This is because, in a case where the combination of the loops having the different loop shapes is to be fused, arithmetic operations in the loop after fusion become large and inefficient loop fusion is likely to be performed, but the functions of the information processing apparatus 100 suppress the inefficient loop fusion. Therefore, the degree of freedom of the combination of the loops to which loop fusion is performed is increased, a possibility of more efficient loop fusion is increased.

The function of the compiler of the information processing apparatus 100 is effective for an architecture in which the number of registers is relatively small and the number of cycles of the registers is relatively large, for example.

In the second embodiment, various types of data for determining loop fusion are extracted from the intermediate language (intermediate code), and the embodiment is not limited thereto. For example, the compiler 140 may extract the various types of data from the source program 111. The compiler 140 may use the source program 111 to specify a combination of loops as a fusion candidate, and use an intermediate language to extract data such as the number of variables, the number of registers, the number of memory commands, and the number of arithmetic commands for each loop.

The information processing apparatus 100 described in the second embodiment executes, for example, the following processes.

For each of a plurality of loops included in an intermediate code, the optimization unit 144 acquires loop information 132 including the number of variables, the number of registers, the number of memory commands, and the number of arithmetic commands used in the loop. Based on the loop information 132, the optimization unit 144 calculates, for each of a plurality of combinations of loops, the number of variables, the number of registers, the number of memory commands, and the number of arithmetic commands, which correspond to the combination of loops that are candidates for loop fusion. Based on the number of variables, the number of registers, and a comparison of the number of memory commands and the number of arithmetic commands, which are calculated for each of the plurality of combinations of loops, the optimization unit 144 determines a combination to which loop fusion is to be applied, among the plurality of combinations. The optimization unit 144 executes loop fusion on the determined combination.

Thus, it is possible to improve processing performance of the execution file 113 including an object code generated by using an intermediate code after loop fusion.

Based on the intermediate code, the optimization unit 144 acquires, as a loop fusion candidate, a combination to which two or more loops having different acquirable values of control variables of the loop belong.

This increases the degree of freedom of loop fusion and a possibility that more efficient loop fusion is performed.

The optimization unit 144 prioritizes a combination having a large calculated number of variables among a plurality of combinations of the loops of the fusion candidate, and determines the combination to which loop fusion is to be applied.

This increases a possibility that a parallelism of arithmetic operations is improved and the arithmetic elements are efficiently used.

Among the plurality of combinations of the loops of the fusion candidate, the optimization unit 144 determines a combination in which the calculated number of registers is equal to or less than the number of available registers in an apparatus scheduled to execute the object code generated by compiling, as a combination to which loop fusion is to be applied.

This reduces a possibility that spilling or filling occurs and increases a possibility that the registers are effectively used.

The optimization unit 144 determines, as a combination to which loop fusion is to be applied, a combination in which the number obtained by subtracting a predetermined value from the calculated number of memory commands is equal to or larger than the number of arithmetic commands, among the plurality of combinations of the loops as the fusion candidate.

In this manner, by applying loop fusion to the combination of loops in which the number of arithmetic commands does not become too large as compared to the number of memory commands, it is possible to appropriately distribute and allocate a plurality of commands to a plurality of arithmetic elements, and it is possible to increase a possibility that the registers and the arithmetic elements may be efficiently used.

The optimization unit 144 may determine the predetermined value to be subtracted from the number of memory commands, in accordance with the number of memory commands that are simultaneously executable by the apparatus scheduled to execute the object code generated by compiling. For example, the optimization unit 144 may set the number of memory commands that are simultaneously executable, as the predetermined value in the corresponding apparatus.

Thus, the number of arithmetic commands may be appropriately compared with the number of memory commands, and a possibility of efficiently using the register and the arithmetic element may be further increased by the loop fusion.

The information process according to the first embodiment may be realized by causing the processing unit 12 to execute a program. The information process according to the second embodiment may be realized by causing the CPU 101 to execute a program. The program may be recorded on the computer-readable recording medium 53.

For example, the program may be distributed by distributing the recording medium 53 on which the program is recorded. The programs may be stored in another computer and the programs may be distributed via a network.

For example, the computer may store (install) the program recorded in the recording medium 53 or the program received from another computer in a storage device such as the RAM 102 or the HDD 103, read the program from the storage device, and execute the program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
a memory configured to store a code to be processed; and
a processor configured to:
for each of a plurality of loops included in the code, acquire loop information including a number of variables, a number of registers, a number of memory commands for inputting and outputting a value of the variable between the register and a main storage device, and a number of arithmetic commands for the value of the variable stored in the register, which are used in the loop;
based on the acquired loop information, calculate the number of variables, the number of registers, the number of memory commands, and the number of arithmetic commands, which correspond to a combination of the loops that are candidates for loop fusion, for each of a plurality of the combinations of the loops;
determine a combination to which the loop fusion is to be applied among the plurality of combinations, based on the number of variables, the number of registers, and a comparison of the number of memory commands and the number of arithmetic commands, which are calculated for each of the plurality of combinations; and
execute the loop fusion on the determined combination.

2. The information processing apparatus according to claim 1,
wherein the processor acquires the combination to which two or more loops having different acquirable values of control variables of the loops belong, as the candidate for the loop fusion, based on the code.

3. The information processing apparatus according to claim 1,
wherein the processor prioritizes the combination having a large calculated number of variables to determine the combination as the combination to which the loop fusion is to be applied, among the plurality of combinations.

4. The information processing apparatus according to claim 1,
wherein the processor determines the combination in which the calculated number of registers is equal to or less than the number of available registers in an apparatus scheduled to execute an object code generated by the compiling, among the plurality of combinations, as the combination to which the loop fusion is to be applied.

5. The information processing apparatus according to claim 1, wherein the processor determines the combination in which a number obtained by subtracting a predetermined value from the calculated number of memory commands is equal to or larger than the number of arithmetic commands, among the plurality of combinations, as the combination to which the loop fusion is to be applied.

6. The information processing apparatus according to claim 5,
wherein the processor determines the predetermined value in accordance with the number of memory commands that are simultaneously executable by an apparatus scheduled to execute an object code generated by the compiling.

7. A non-transitory computer-readable recording medium storing an information processing program causing a computer to execute processing of:
for each of a plurality of loops included in the code, acquiring loop information including a number of variables, a number of registers, a number of memory commands for inputting and outputting a value of the variable between the register and a main storage device, and a number of arithmetic commands for the value of the variable stored in the register, which are used in the loop;
based on the acquired loop information, calculating the number of variables, the number of registers, the number of memory commands, and the number of arithmetic commands, which correspond to a combination of the loops that are candidates for loop fusion, for each of a plurality of the combinations of the loops;
determining a combination to which the loop fusion is to be applied among the plurality of combinations, based on the number of variables, the number of registers, and a comparison of the number of memory commands and the number of arithmetic commands, which are calculated for each of the plurality of combinations; and
executing the loop fusion on the determined combination.

8. An information processing method comprising:
for each of a plurality of loops included in the code, acquiring, by a computer, loop information including a number of variables, a number of registers, a number of memory commands for inputting and outputting a value of the variable between the register and a main storage device, and a number of arithmetic commands for the value of the variable stored in the register, which are used in the loop;
based on the acquired loop information, calculating the number of variables, the number of registers, the number of memory commands, and the number of arithmetic commands, which correspond to a combination of the loops that are candidates for loop fusion, for each of a plurality of the combinations of the loops;
determining a combination to which the loop fusion is to be applied among the plurality of combinations, based on the number of variables, the number of registers, and a comparison of the number of memory commands and the number of arithmetic commands, which are calculated for each of the plurality of combinations; and
executing the loop fusion on the determined combination.

* * * * *